(12) United States Patent
Konishi et al.

(10) Patent No.: US 7,485,829 B2
(45) Date of Patent: Feb. 3, 2009

(54) METHOD OF PRODUCING SOLID WIRE FOR WELDING

(75) Inventors: Yoshihiro Konishi, Fujisawa (JP);
Hiroyuki Shimizu, Fujisawa (JP);
Yasuyuki Yokota, Fujisawa (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 394 days.

(21) Appl. No.: 10/910,747

(22) Filed: Aug. 4, 2004

(65) Prior Publication Data
US 2005/0045699 A1 Mar. 3, 2005

(30) Foreign Application Priority Data
Aug. 26, 2003 (JP) ............................. 2003-301520
Oct. 30, 2003 (JP) ............................. 2003-370736

(51) Int. Cl.
*B23K 35/02* (2006.01)
*B23K 9/00* (2006.01)
*B23K 33/00* (2006.01)
*B23K 35/30* (2006.01)

(52) U.S. Cl. ............................. 219/145.1; 219/145.22; 219/137 R; 219/145.32; 219/136

(58) Field of Classification Search ............... 219/145.1, 219/145.22, 137 R, 145.32, 136
See application file for complete search history.

(56) References Cited

U.S. PATENT DOCUMENTS

| | | | | |
|---|---|---|---|---|
| 3,226,817 A * | 1/1966 | Simborg et al. | ................ | 29/430 |
| 3,478,552 A | 11/1969 | Dane | | |
| 3,622,383 A * | 11/1971 | Dane | ........................... | 428/385 |
| 4,950,151 A * | 8/1990 | Zachariades | ............. | 425/379.1 |
| 5,201,206 A * | 4/1993 | Russo | ........................... | 72/40 |
| 5,918,495 A * | 7/1999 | Miyamoto et al. | ............ | 72/108 |
| 6,079,243 A | 7/2000 | Inoue et al. | | |

FOREIGN PATENT DOCUMENTS

| | | | |
|---|---|---|---|
| DE | 3234902 A1 * | 9/1982 | |
| EP | 0 914 899 A1 | 5/1999 | |
| EP | 914899 A1 * | 5/1999 | |

(Continued)

OTHER PUBLICATIONS

Patent Abstracts of Japan, JP 04-300095, Oct. 23, 1992.

(Continued)

*Primary Examiner*—M. Alexandra Elve
(74) *Attorney, Agent, or Firm*—Oblon, Spivak, McClelland, Maier & Neustadt, P.C.

(57) ABSTRACT

A method for efficient production of a welding solid wire free of copper plating. The method consists of drawing by means of roller dies with the help of a dry solid lubricant for drawing which is at least either of sodium stearate or potassium stearate, removing the lubricant from the wire surface by means of a washing device, and applying a lubricant for wire feeding to the surface of the drawn wire by means of an oiling device. High-speed drawing by means of roller dies makes a stock wire into a welding solid wire having the diameter of the finished wire or nearly finished wire. The drawing step is followed by the washing step and the lubricant applying step, which are all accomplished in-line.

7 Claims, 6 Drawing Sheets

FOREIGN PATENT DOCUMENTS

| | | |
|---|---|---|
| JP | 3-77035 | 12/1991 |
| JP | 10-249576 | 9/1998 |
| JP | 10-296488 | 11/1998 |
| JP | 11-197878 | 7/1999 |
| JP | 2000-107881 | 4/2000 |
| JP | 2000-117486 | 4/2000 |
| KR | 2000-0016065 | 3/2000 |
| KR | 2001-0003071 | 1/2001 |

OTHER PUBLICATIONS

Patent Abstracts of Japan, JP 60-231599, Nov. 18, 1985.

* cited by examiner

FIG.3
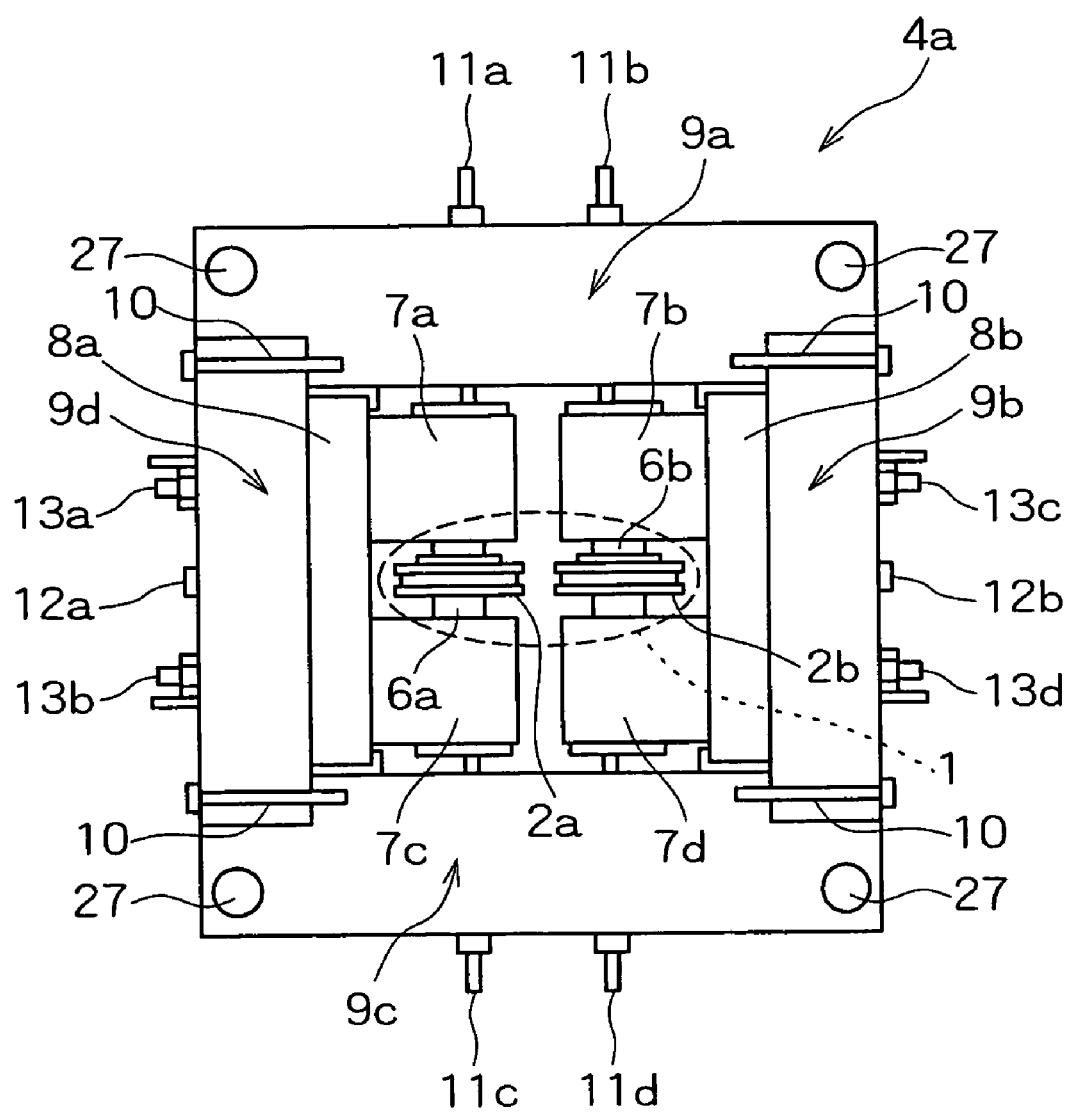
DIRECTIONS OF EXPANDING LOADS

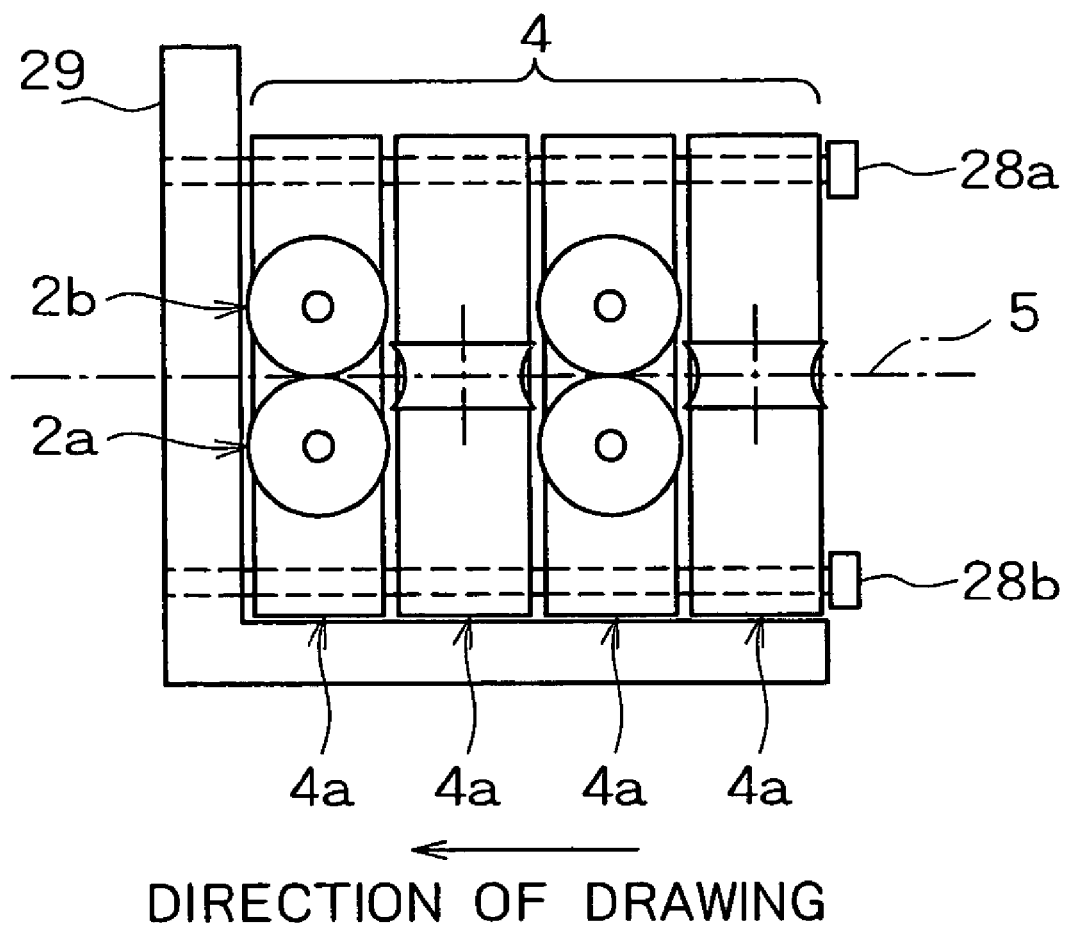

METHOD OF PRODUCING SOLID WIRE FOR WELDING

BACKGROUND OF THE INVENTION

1. Field of the Invention

The present invention relates to a method of producing a solid wire for welding which has no copper plating. (In this specification, a simple term "wire" may be used in place of "solid wire".)

2. Description of the Related Art

It is common practice to use a thin solid wire for welding (0.8-1.6 mm in diameter) in $CO_2$ gas shield arc welding and MIG welding. When in use, the solid wire for welding is wound on a spool or placed in a pail pack. It is pulled out of the spool (or pail pack) by a feed roller and then pushed into a liner enclosed by a conduit cable and finally sent through the liner to the nozzle of the welding torch at the welding position.

The conduit liner mentioned above is a flexible guide tube formed from a spirally wound steel wire. It is usually 3-6 meters long and sometimes as long as 10-20 meters, depending on the distance to the welding position. The feeding of a wire for welding should be accomplished stably at a constant speed regardless of working places, where space may be limited or obstructed by steps or bends, as in a shipbuilding yard. Such stable feeding is one of the most important characteristic properties of a wire for welding, which is referred to as wire feedability.

When pushed into a conduit liner by a feed roller, a wire for welding undergoes feed resistance due to friction with the inside of the conduit liner. This feed resistance is not so large in a straight conduit liner as to pose problems with feedability. However, in the case of a long conduit liner or a sharply or repeatedly bent conduit liner, the feed resistance increases to such an extent that it does not balance with the feeding force any longer, resulting in the feedability deteriorating extremely.

Consequently, in order to ensure a stable feedability, it is necessary to reduce feed resistance due to friction with the conduit liner. A common way to reduce feed resistance and improve wire feedability is to coat the surface of a wire for welding with copper plating or a lubricant. Incidentally, copper plating produces an additional effect of greatly improving drawability, conductivity, and rust prevention.

Unfortunately, a solid wire for welding with copper plating or lubricant coating has drawbacks. That is, excess lubricant is easily scraped off as the solid wire is pressed by the feed roller. Residues of scraped lubricant enter the conduit liner and accumulate therein, which leads to an anomalous increase in feed resistance. Copper plating also causes a similar trouble. Residues scraped off from the copper plating pose a serious problem with an extreme increase in feed resistance. Moreover, the cyan compound used for copper plating is a source of environmental pollution. Under these circumstances, there has been a strong demand for a solid wire for welding which has no copper plating.

Copper plating on a solid wire for welding functions as a lubricating coating to improve feedability as well as drawability in the wire manufacturing process. Therefore, efficient drawing of a solid wire for welding which has no copper plating needs a good lubricant that supersedes copper plating or an improved drawing technology which obviates the necessity of copper plating.

The thin solid wire for welding as mentioned above is produced from a large-diameter wire ("stock" for short hereinafter) by passing it through a series of hole dies or roller dies. The above-mentioned technology to obviate the necessity of copper plating is disclosed in, for example, Japanese Patent Laid-open No. Hei-10-296488. It specifies the reduction of area for the drawing die, thereby preventing the wire breakage that occurs during high-speed drawing. Another way to prevent an anomalous increase in feed resistance has been proposed in, for example, Japanese Patent Laid-open No. 2000-117486. It relies on an improved lubricant which firmly adheres to the wire.

In production of a solid wire for welding which has no copper plating, the stock to be drawn needs surface treatment, such as bonderizing and boralization, which ensures good adhesion between the wire surface and the drawing lubricant. Such surface treatment poses problems with production cost and environmental pollution. Among common lubricants is calcium soap, which is a dry solid lubricant. Unfortunately, since calcium produces an extremely adverse effect on arc stability, calcium soap has to be removed by annealing, alkali degreasing, pickling, and washing with an organic detergent after drawing (to the final diameter or intermediate diameter). This also poses problems with production cost and environmental pollution.

On the other hand, a solid wire for $CO_2$ gas shield arc welding suffers difficulties in firmly holding a predetermined amount of lubricating oil if it has a compact smooth surface. This problem is addressed by slightly roughening the wire surface. A surface-roughened wire permits feeding lubricant oil to be coated uniformly in its lengthwise direction. See Japanese Patent Laid-open No. 2000-107881.

A variety of similar technologies have been proposed. One of them is designed to interpose roller die drawing between dry hole die drawing and wet hole die drawing, thereby reducing the reduction of area to be achieved by wet drawing. Its object is achieved by roughening the surface of the finished wire to such an extent that surface irregularities firmly hold the feeding lubricant. See U.S. Pat. No. 6,079,243.

There has been proposed a method of transferring previously formed surface irregularities on a roller die to the wire surface. The finished wire effectively retains the feeding lubricant. See Japanese Patent Laid-open No. Hei-10-249576.

There has been proposed a technology for improving drawability while maintaining adequate surface roughness. This object is achieved by using $MoS_2$ and $WS_2$ as the drawing lubricant and specifying the reduction of area due to hole die drawing. This technology is based on the relationship between the area of reduction due to hole die drawing and the amount of lubricant adhering to the wire. See Japanese Patent Laid-open No. Hei-11-197878.

There has also been proposed a technology for causing potassium carboxylate to adhere to the wire surface in order to improve the arc stability. This object is achieved by washing the drawn wire with hot water and then subjecting the washed wire once to roller die drawing or roller pressing. See Japanese Patent Publication No. Hei-3-77035.

The foregoing technologies, however, are not practicable for a solid wire for welding which has no copper plating. In other words, they are incapable of providing the wire surface with irregularities large enough for them to hold sufficient lubricating oil, while maintaining the efficient wire productivity.

The disadvantage of a solid wire for welding which has no copper plating is its incapability of high-speed drawing through a hole die for the following reason. Hole die drawing, which is predominant in production of solid wires for welding, applies a much larger shear force to the lubricant layer than roller die drawing, and the shear force breaks the lubricant film. This problem readily arises when hole die drawing is carried out without the wire being treated with a lubricant of calcium stearate.

The same problem as above is also involved in the above-mentioned two-stage drawing process, which consists of dry hole die drawing and wet drawing. This drawing process is not applicable to high-speed drawing of a wire without copper plating because wet drawing is inferior to dry drawing in drawability. Moreover, as described in U.S. Pat. No. 6,079,243-given above, the surface roughness of a wire rapidly decreases during drawing, and hence it is difficult for the wire to maintain its surface roughness throughout the drawing process from the semi-finished stage (in which surface irregularities are made) to the final stage.

The above-mentioned $MoS_2$ and $WS_2$ as the drawing lubricant do not provide sufficient drawability in hole die drawing and roller die drawing, which makes it difficult to perform high-speed drawing on a wire without copper plating. Moreover, such lubricants remaining in excess amounts make unstable electric current flowing through the finished wire and residues of scraped lubricants aggravate the wire feedability. Therefore, it is necessary that the lubricant be applied uniformly, allowed to remain uniformly, and finally washed off uniformly. These problems lead to inefficient drawing and unstable quality. In addition, direct application of sulfides (such as $MoS_2$ and $WS_2$), without adequate rust-preventive treatment on the stock wire, deteriorates the corrosion resistance of welding wire.

The disadvantage of transferring surface irregularities to the wire surface from a roller die is that it is very difficult to control the roller surface which is subject to wear. This leads to unstable wire quality and high production cost due to frequent roller replacement.

The roller die is more suitable to high-speed drawing than the hole die, because it is made up of a pair of facing rollers which grip the wire. Because of this structure, the roller die applies a smaller shearing force to the lubricant layer during drawing than the hole die and hence causes the breakage of lubricant film less frequently. Moreover, the roller die is less subject to clogging than the hole die even in the case of drawing with a hydrogen-free inorganic solid lubricant which will not pose a problem with hydrogen increase. It would be possible to greatly improve the drawing speed and efficiency if the roller die is mainly employed to draw a welding solid wire free of copper plating.

However, the roller die has never been used to draw a welding solid wire free of copper plating at a high speed from the stock to the finished product. Drawing a welding solid wire free of copper plating without adverse effects on welding performance is limited in speed so long as it relies only on roller dies. High-speed drawing with roller dies presents more difficulties in the case of high-strength steel welding wire free of copper plating than in the case of ordinary mild steel welding wire. (The high-strength steel includes high-tension steel, alloy steel, and stainless steel, which are selected according to the work to be welded.)

As compared with mild steel welding wires, high-strength steel welding wires need a larger drawing force and hence exerts a larger load on the roller dies. With a large working force applied during drawing, the roller dies are subject to deformation and vibration, because the roller dies and their supporting frames are limited in strength and stiffness. This vibration causes the welding wire to come into contact with the roller die intermittently, thereby leaving minute dents on the wire surface. Such dents aggravate the accuracy of wire diameter and lead to the surface roughening of the wire. To avoid this problem, it is necessary reduce the drawing speed, even though drawing with roller dies is practicable. This leads to a low drawing efficiency and a low wire productivity.

There has been no instance in which drawing is substantially accomplished by means of roller dies only from the stock wire to the finished product. Even though such an instance exists, it would be impossible to draw a high-strength welding solid wire at a high speed.

The limitation of drawing speed is attributable to the roller dies which wear out and pose a problem with lubrication (as in the hole die). In the drawing of a welding wire free of copper plating, the stock wire may need surface treatment (such as bonderizing and boralization) for better adhesion between the wire surface and the lubricant. If this surface treatment is omitted, it is necessary to use a dry solid lubricant, such as calcium soap which provides good lubricity. Unfortunately, calcium soap remaining on the surface of the finished welding wire, however small the amount may be, greatly aggravates the arc stability. For this reason, a separate washing process is required to thoroughly remove calcium soap after drawing is completed. The result is high production cost and environmental pollution. Therefore, the use of calcium soap is detrimental to production of a welding wire free of copper plating.

For the reasons mentioned above, there has existed no in-line process for continuous production of a welding wire free of copper plating, said process including the steps of drawing, washing out lubricants for drawing, and applying lubricants for wire feeding. Even though such a process exists, it would be impossible to carry out these steps at the same high speed as drawing. Incidentally, the term "in-line" means continuous operation of drawing and its subsequent steps.

As mentioned above, in production of welding wires (including high-strength ones) free of copper, drawing from stock wires to finished wires has never been performed only by means of roller dies. Moreover, welding wires have never been produced by a continuous process including drawing, washing to remove drawing lubricants, and application of feeding lubricants. Even though such a continuous process exists, it would have been impossible to run it at a high speed.

OBJECT AND SUMMARY OF THE INVENTION

The present invention was completed in view of the foregoing. It is an object of the present invention to provide a process for efficient production of welding solid wires free of copper plating, said process consisting of the steps of drawing a stock wire into a finished (or nearly finished) wire at a high speed by means of roller dies, washing out drawing lubricants, and applying feeding lubricants, which are accomplished continuously in a single production line.

The present invention is directed to a method for producing a welding solid wire free of copper plating by drawing from a stock wire into a finished wire, said method comprising a step of applying to the surface of a wire a dry solid lubricant for drawing which contains at least either of sodium stearate or potassium stearate, a step of drawing the lubricant-coated wire by means of roller dies, a step of removing the drawing lubricant from the surface of the drawn wire, and a step of applying a lubricant for wire feeding to the surface of the wire from which the dry solid lubricant for drawing has been removed.

The above-mentioned method for production of a welding solid wire is characterized by that at least part of the step of drawing the wire, the step of removing the dry solid lubricant for drawing, and the step of applying the lubricant for wire feeding are performed in-line.

According to the present invention, the dry solid lubricant used for drawing a welding solid wire free of copper plating should be either sodium stearate or potassium stearate. However, the lubricant for drawing by means of roller dies which is used in the present invention does not mean a simple substance of sodium stearate or potassium stearate. It may contain any additives, such as high pressure lubricant (extreme pressure agent) and softening point adjusting agent, as mentioned later.

The stearate should preferably be water-soluble soap, which exhibits good lubricity during high-speed drawing (from a stock wire to a finished or nearly-finished wire) to be accomplished mostly by means of roller dies. Moreover, it does not need the step of off-line washing but it can be removed by the in-line washing step.

Therefore, the present invention makes it possible to produce welding solid wires free of copper plating by a continuous in-line process which includes drawing from a steel stock wire to a finished or nearly finished wire (substantially by means of roller dies), washing of drawing lubricants, and application of feeding lubricants.

According to the present invention, drawing by means of roller dies is accomplished to such an extent that the drawn wire has a diameter of the finished wire or nearly finished wire.

Incidentally, it is impossible to accomplish high-speed drawing by means of a hole die (which is predominant in production of welding wires) with the help of sodium stearate or potassium stearate. In other words, as compared with drawing by means of roller dies, drawing by means of hole dies exerts a larger shear force to the lubricant layer at the die face. Therefore, the soap of the present invention tends to pose a problem with lubricant film breakage in high-speed drawing by means of hole dies even though it contains additives such as high pressure lubricant and softening point adjusting agent. It is in this point that the soap of the present invention greatly differs from the above-mentioned metal soap lubricant (based on calcium stearate) which is generally used for drawing by means of hole dies.

According to a preferred embodiment of the present invention, a step of drawing by means of hole dies may be performed, before or between a series of drawing by means of roller dies, in such a way that the total reduction of diameter ΣRd is in the range of 0.5% to 78%. The advantage of this embodiment is that it is possible to uniformly apply a lubricant to the surface of the wire which has been drawn by means of hole dies, so that drawing in the subsequent step by means of roller dies can be accomplished without a new dry solid lubricant being applied for drawing.

The present invention provides a method for producing highly efficiently welding solid wires free of copper plating by a continuous in-line process which includes drawing from a steel stock wire to a finished or nearly finished wire by means of roller dies, washing of drawing lubricants, and application of feeding lubricants. The method of the present invention may be applicable to high-speed drawing of not only mild steel solid wires for welding which do not have copper plating but also high-strength steel wires for welding which do not have copper plating. (High-strength steel includes high-tensile steel, alloy steel, stainless steel, etc.)

BRIEF DESCRIPTION OF THE DRAWINGS

FIG. 3 is a front view of one example of the roller die drawing apparatus used in the present invention.

FIG. 5 is a front view showing how the roller die drawing apparatus is used in the present invention.

FIG. 6b is a plan view of the frame shown in FIG. 6a.

DESCRIPTION OF THE PREFERRED EMBODIMENTS

The embodiments of the present invention will be described with reference to the accompanying drawings.

(Steps for Production of Solid Wires for Welding)

Figure 1:
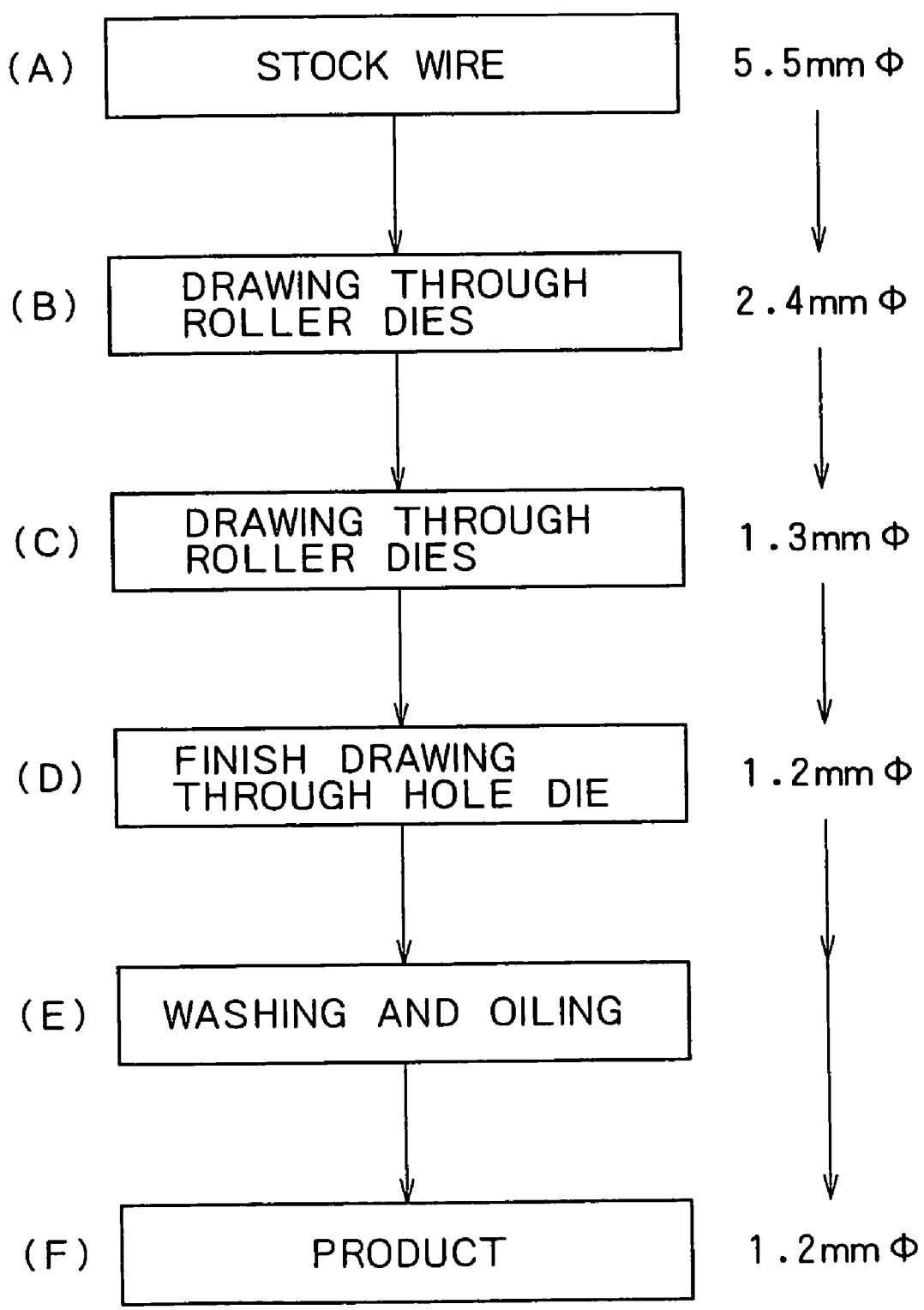
FIG. 1 is a flow diagram showing one embodiment of the present invention.
Figure 2:
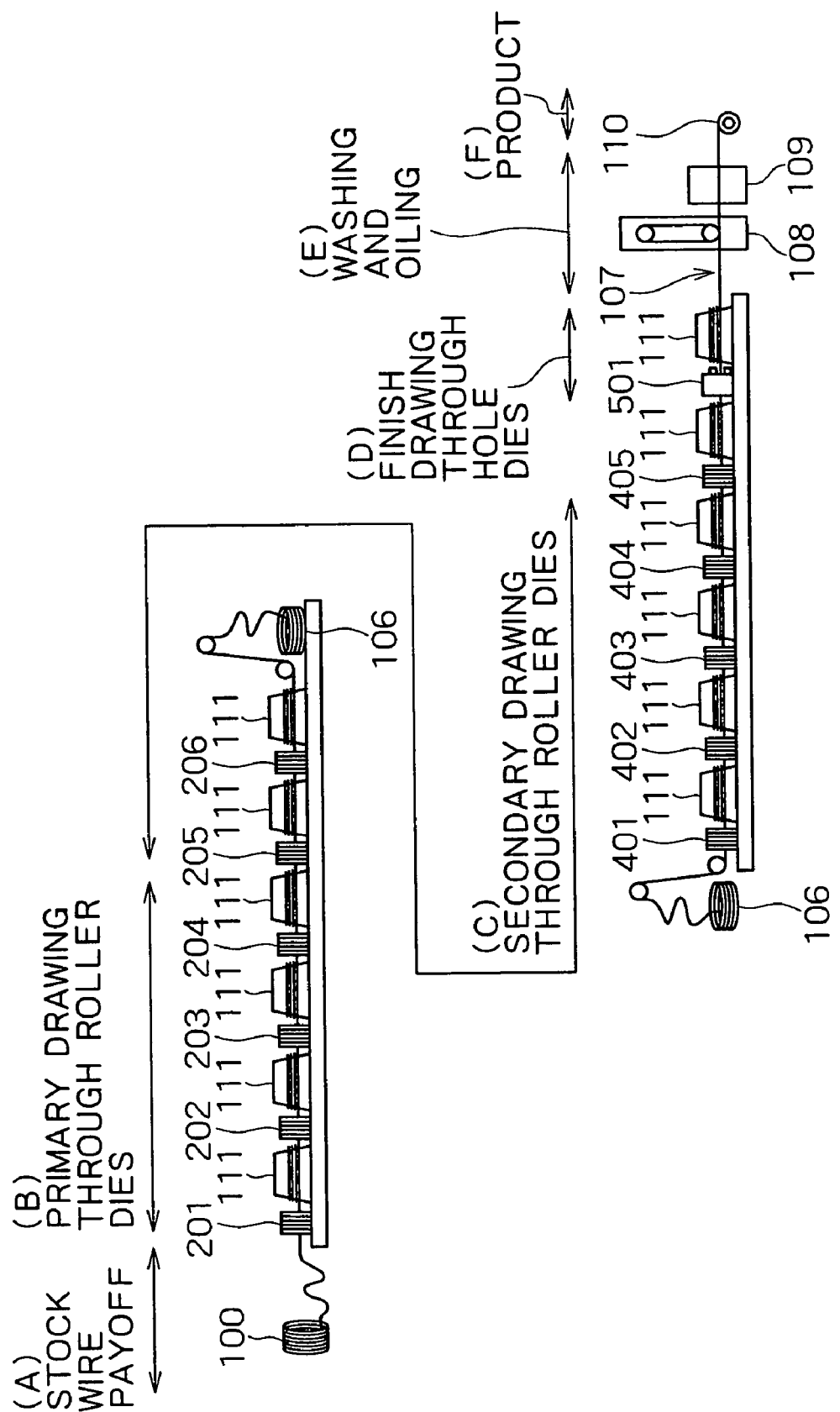
FIG. 2 is a process chart of the embodiment shown in FIG. 1.

FIGS. 1 and 2 are a flow diagram and a process chart, respectively, illustrating the outline of manufacturing steps (including high-speed drawing step) for welding solid wires.

FIGS. 1 and 2 show the steps of producing a welding solid wire (1.2 mm in diameter) from a high-strength steel stock wire (5.5 mm in diameter). The drawing step shown in FIG. 2 consists of two sections: (B) primary drawing and (C) secondary drawing. The primary drawing and secondary drawing are intended to reduce the diameter of the stock wire to the diameter of the nearly finished wire merely by means of roller dies (excluding hole dies). In other words, all the steps for the primary and secondary drawing are accomplished substantially by means of roller dies.

According to the present invention, drawing to reduce the diameter of the stock wire to the diameter of the finished or nearly-finished wire is accomplished mostly by means of roller dies in production of welding solid wires free of copper plating. Also, according to the present invention, drawing by means of roller dies is accomplished entirely with dry lubrication not with wet lubrication, as mentioned later. However, the present invention embraces the embodiment in which drawing by means of hole dies is used to apply a lubricant for drawing by means of roller dies. Therefore, the present invention embraces the embodiment in which drawing by means of hole dies is performed before the primary drawing (B) or between the primary drawing (B) and the secondary drawing (C). Also, the present invention embraces the embodiment in which drawing by means of hole dies is used for finish drawing which is performed after drawing by means of roller dies.

The above-mentioned apparatus for drawing by means of roller dies can be applied to high-speed drawing. "High speed" means no lower than 600 m/min, preferably no lower than 700 m/min, in both the primary drawing (B) and the secondary drawing (C), in the case where a welding wire is formed from a high-strength steel stock wire having a strength no lower than 500 MPa. According to the present invention, sodium stearate or potassium stearate is used as the dry solid lubricant in the primary drawing (B) and the second primary drawing (C) to produce welding solid wires free of copper plating. This dry solid lubricant helps increase the speed of drawing by means of roller dies. Particularly, it makes it possible to draw at a high speed a welding solid wire free of copper plating which usually presents difficulties in drawing.

According to the present invention, the diameter of the stock steel wire that can be drawn by means of roller dies is the same as that of the stock steel wire that can be drawn conventionally by means of hole dies. Usually, the diameter of the stock steel wire is about 2-8 mm. The steel stock wire in general use is a hot-rolled wire or a cold-rolled wire. The former has a diameter of 4.0-6.0 mm and the latter has a diameter of 2.2-4.0 mm (both at the entrance of a train of roller dies). The hot-rolled and cold-rolled wire can be used as the stock wire. They may also be used as the stock wire after they have been cold-drawn to the desired diameter by means of hole dies, roller dies, or micromill rolling. The stock wire may be obtained from a hot-rolled wire by drawing (for its diameter to decrease from 4.0-6.0 mm to 2.2-4.0 mm) by means of hole dies with the help of a conventional dry solid lubricant composed mainly of calcium stearate, followed by annealing and pickling for removal of lubricant.

The process shown in FIG. 2 consists of two steps (A) and (B) in its first half part. Step (A) is to unwind the coil 100 of high-strength steel stock wire, which has a strength no lower than 500 MPa. Step (B) is to draw the stock wire until its diameter is reduced to 2.4 mm and then wind the drawn wire to give the coil 106. Drawing in step (B) is accomplished by a train of six drawing units (201, 202, 203, 204, 205, and 206) arranged in series. Each drawing unit consists of four stages of roller dies (as mentioned later with reference to FIG. 5). The wire being drawn is coated with the drawing lubricant specified in the present invention. Incidentally, the units indicated by 111 in FIG. 2 are take-up capstans, each of which is placed between adjacent dies.

The process shown in FIG. 2 consists of three steps (C), (D), and (E) in its second half part. Step (C) is to unwind the coil 106 and draw the wire until its diameter is reduced from 2.4 mm to 1.3 mm (or 1.2 mm). The diameter of 1.3 mm is that of a nearly finished wire, and the diameter of 1.2 mm is that of a finished wire. Drawing in step (C) is accomplished by a train of five drawing units (401, 402, 403, 404, and 405) arranged in series. Each drawing unit consists of four stages of roller dies (as mentioned later with reference to FIG. 5). The wire being drawn is coated (or not newly coated) with the drawing lubricant specified in the present invention. The drawn wire with a diameter of nearly finished wire undergoes finishing drawing (sizing) in step (D) by means of hole die 501 (in one stage) which improves the accuracy of wire diameter. Thus, the drawn wire 1.3 mm in diameter is made into the finished wire 1.2 mm in diameter.

The drawing lubricant specified in the present invention is applied to the wire mandatorily in the primary drawing step (B) and mandatorily or optionally in the secondary drawing step (C), immediately before the roller die drawing units 201 and 401, respectively.

The secondary drawing step (C) may or may not include step (D) for finish drawing by means of hole die 501. Choices depend on necessity for handling of the welding wire and diameter accuracy required of the finished welding wire. Step (D) may be omitted as a matter of course.

The drawing steps are followed by the washing step (E), in which the drawn wire is passed through a washing vessel 108 holding plain warm water (without organic detergent and acid or alkali), so that the wire is cleaned of residual lubricant. The washed wire passes through the oiling step (E) for coating with a feeding lubricant. The wire which has undergone the series of steps as mentioned above inline is finally wound up in step (F). Thus there is obtained the desired product, a welding wire 1.2 mm in diameter, as the coil 110. Incidentally, cleaning in the washing step (E) may be accomplished by wiping or shaking (or tapping) the wire, or by a combination thereof. Wiping may be achieved with the help of wiper rolls provided with felt or abrasive cloth.

FIG. 2 shows an embodiment in which the primary drawing step (B) and the secondary drawing step (C), both relying on roller dies, are separated. This arrangement is intended for efficient drawing from the high-strength stock wire (with a comparatively large diameter of 5.5 mm) into the final welding solid wire (with a comparatively small diameter of 1.2 mm). Thus, drawing may be accomplished in two separate steps or in a continuous single step. Choices depend on the desired productivity which varies depending on the diameters of the stock wire and finished wire. The drawing system may consist of one line (or more than one line) for the primary drawing step (B) and more than one line (or one line) for the secondary drawing step (C). Choices depend on the productivity desired. The embodiment in the present invention is designed to perform drawing by means of roller dies (from the stock wire to the finished or nearly finished wire) in-line (continuously in a single line); or in separate in-line drawing steps.

However, according to the present invention, the washing and oiling step (E) that follows drawing by means of roller dies is carried out in-line. If the step (E) is carried out off-line, the productivity of the welding solid wire will be very poor and the advantage of high-speed drawing by means of roller dies will be lost.

(Dry Solid Lubricant for Drawing)

The following is concerned with the dry solid lubricant for drawing which is used in the present invention. According to the present invention, drawing is accomplished entirely in dry process (not in wet process) by means of roller dies with a lubricant. The dry solid lubricant used for high-speed drawing of high-strength welding solid wires free of copper plating needs to have a characteristic property that it exhibits good lubricity in drawing by means of roller dies. In addition, it should be easily removed in the in-line washing step after drawing by means of roller dies.

According to the present invention, the lubricant that meets these requirements is a solid dry lubricant composed mainly of water-soluble stearic acid-derived soap such as sodium stearate and potassium stearate. It exhibits good lubricity in drawing by means of roller dies and it is easily removed by the in-line washing step without the necessity of any off-line washing step such as annealing, alkali degreasing, pickling, and washing with an organic detergent. In addition, it keeps the surface of the finished welding wire slightly alkaline, thereby protecting the wire surface from oxidation and hence providing good rust preventive performance. Because of these properties, the lubricant for drawing and the lubricant for feeding may be incorporated with a very small amount of sulfides for improvement in lubricity.

Moreover, the dry solid lubricant composed mainly of stearic acid-derived soap, such as sodium stearate and potassium stearate, is superior in adhesion to the surface of the stock wire and the wire being drawn. Therefore, it obviates the necessity for so-called stock wire processing, for example, bonderizing, lime treatment, or boralization which is commonly applied to the stock wire to be made by drawing into welding wires free of copper plating. The simplified process without treatment on the stock wire is the great advantage of the dry solid lubricant applied to drawing by means of roller dies in the present invention.

However, the above-mentioned stearic acid-derived soap has such a low softening point when used alone that it tends to carbonize in the hole die when the welding solid wire free of copper plating is drawn at a high speed by means of roller dies. This may cause a hindrance to high-speed drawing. Therefore, the lubricant should preferably have a high softening point for high-speed and efficient operation. This object is achieved by incorporation with a softening point adjusting agent, which is one or more than one species selected from sodium phosphate, sodium borate, sodium phosphite, sodium carbonate, potassium phosphate, potassium borate, potassium nitrite, and potassium carbonate. The softening point adjusting agent permits high-speed drawing of welding solid wires free of copper plating.

Moreover, the dry solid lubricant should preferably be incorporated further with a high pressure lubricant, which is one or more than one species selected from $MoS_2$, $WS_2$, BN, ZnS, and graphite, for improvement in lubricity and protection of the surface of roller dies.

The drawing lubricant with a composition as mentioned above has the advantage of not affecting arc stability even thought it remains in small quantities on the surface of the finished welding wire in the in-line washing step which follows drawing by means of roller dies. In other words, it is easily removed by the simple in-line washing step (mentioned later) in place of the complicated off-line washing step mentioned above, and yet the finished welding wire has good arc stability.

In contrast to the dry solid lubricant specified in the present invention, a wet lubricant (in the form of aqueous solution) or lubricating oil does not exhibit good lubricity in production of high-strength welding solid wires free of copper plating by high-speed drawing by means of roller dies. The reason for this is that the film of wet lubricant is easily broken by shear force applied to the lubricant layer on the surface of roller dies when the high-strength welding solid wire free of copper plating undergoes high-speed drawing by means of roller dies.

Production of welding wires free of copper plating by drawing by means of hole dies usually relies on a dry solid lubricant containing calcium soap as the stearic acid-derived lubricant. This lubricant exhibits good lubricity as mentioned above. Unfortunately, calcium remaining on the surface of the finished welding wire has an extremely adverse effect on arc stability however small its quantity might be. The surface of the welding wire should be completely free of residual calcium soap. This implies that the in-line simple washing step that follows drawing is not applicable. In other words, calcium soap needs a complicated off-line washing step, such as annealing, alkali degreasing, pickling, and washing with an organic detergent, after drawing by means of roller dies. This is unfavorable to production cost and environment preservation.

The following is concerned with a preferred embodiment for production of the welding solid wire mentioned above.

(Pretreatment of Stock Steel Wire Before Drawing)

The drawing method according to the present invention relies on the dry solid lubricant composed mainly of stearic acid-derived soap (such as sodium stearate and potassium stearate), which exhibits good adhesion to the wire surface during drawing, as mentioned above. Therefore, it basically does not need pretreatment for the stock wire unlike conventional drawing by means of hole dies which needs pretreatment for the stock wire having no copper plating, as mentioned above.

The drawing method according to the present invention needs pretreatment only in the case where the stock wire (produced by hot rolling or cold rolling) is originally soiled with working oil or much scale (oxide film). In this case, contaminants should be washed away off-line or in-line. Washing may be accomplished by any known method, such as pickling, wiping, and mechanical polishing.

(Drawing of Stock Steel Wire by Means of Hole Dies)

According to a preferred embodiment of the present invention, a step of drawing by means of hole dies may be placed before or between a series of steps of drawing by means of roller dies, as mentioned above. The drawing by means of hole dies should be carried out in such a way that the total reduction of diameter $\Sigma Rd$ of the stock steel wire is in the range of 0.5% to 78%. The dry solid lubricant (pertaining to the present invention) may be applied to the surface of the wire which has been drawn by means of hole dies. In the case of the embodiment shown in FIG. 2, the hole die for application of the dry solid lubricant may be placed before (upstream) the roller die drawing apparatus 201 in the primary drawing step (B) or before (upstream) the roller die drawing apparatus 401 in the secondary drawing step (C). In this way it is possible to apply the dry solid lubricant uniformly onto the surface of the wire which has been drawn by means of hole dies. The thus applied lubricant permits drawing by means of roller dies in the second half stage without the necessity of newly applying the dry solid lubricant to the wire which has been drawn in the first half stage. Application of the dry solid lubricant in this manner ensures good lubricant adhesion and provides sufficient lubricant necessary for drawing by means of roller dies. This leads to high-speed drawing by means of roller dies. Incidentally, the hole die may be used alone for drawing, but it should desirably be combined with an auxiliary hole die placed immediately before it, which has a larger diameter than the diameter of the wire to be drawn. The auxiliary hole die having an adjusted approach angle helps apply the dry solid lubricant effectively to the surface of the wire being drawn, because the effect of applying the dry solid lubricant to the surface of the wire depends on approach angle. Another way to effectively apply the dry solid lubricant to the wire surface is to use the grooved rollers (pressing rollers) which are placed immediately before the hole die so that they press both sides of the wire to be drawn by spring force.

Thus, drawing by means of the hole die ensures the amount and adhesion of lubricant necessary for drawing by means of roller dies. This makes it possible to carry out sequentially in-line the step of drawing by means of roller dies, the step of finish drawing by means of a hole die, the step of removing the dry solid lubricant from the drawn wire, and the step of applying a lubricant for wire feeding to the surface of the drawn wire. In other words, this embodiment of the present invention is designed to apply the drawing lubricant only in the step of drawing by means of hole dies. In this way it is possible to apply the drawing lubricant sufficient for good drawing by means of roller dies. Application of the lubricant in the step of drawing by means of hole dies ensures good adhesion to the wire surface and minimizes the consumption of lubricant. This solves problems of lubrication in drawing by means of roller dies as in drawing by means of hole dies and problems with residual lubricant (detrimental to wire feeding and arc stability). This in turn permits the lubricant to be applied uniformly, to remain uniformly, and to be removed uniformly in the washing step. This all contributes to efficient wire drawing which is difficult when the problems above are tried to solve only in drawing by means of roller dies.

In the conventional drawing apparatus, a lubricant box, which applies a lubricant to the wire by means of pressing rollers or a forced lubricating nozzle, is placed next to the entrance of the die. In the case of hole die, the exit of the lubricant box corresponds to that part of the hole die which presses the wire, and hence the lubricant box does not scatter the lubricant. By contrast, in the case of roller die, the exit of the lubricant box cannot be sealed completely because of the inherent structure of the roller die. Therefore, the lubricant box scatters the lubricant, thereby increasing the consumption of the lubricant and adversely affecting the working environment. Applying the lubricant to the wire surface in drawing by means of a hole die obviates the necessity of applying the lubricant before drawing by means of roller dies, thereby solving the above-mentioned problems.

This embodiment is designed to accomplish drawing by means of a hole die and drawing by means of roller dies in combination. However, this embodiment is characterized in that drawing by means of a hole die is so accomplished as to supply the lubricant sufficient for subsequent drawing by means of roller dies and to ensure good adhesion of lubricant to the wire to be drawn by means of roller dies. In other words, according to this embodiment, the hole die is not intended to perform drawing but to apply the dry solid lubricant to the surface of the wire while the wire is passing though the hole die, so that drawing by means of roller dies is carried out without the necessity of newly applying the dry solid lubricant in drawing by means of roller dies.

According to this embodiment, the hole die does not function for drawing but it should perform drawing with a certain amount of reduction of diameter so that it applies the lubricant satisfactorily.

In this embodiment, drawing by means of the hole die applies the dry solid lubricant to the surface of the steel stock wire, so that as much lubricant as necessary for drawing by means of roller dies firmly adheres to the wire surface. Whether or not drawing by means of the hole die has successfully applied the dry solid lubricant to the surface of the drawn wire is judged from whether or not subsequent drawing by means of roller dies is capable of drawing a welding solid wire free of copper plating accurately at a high speed without the necessity of newly applying the dry solid lubricant and also from whether or not the finished welding wire is fed smoothly without adverse effect on welding performance.

In this embodiment, drawing by the hole die, which is intended to apply the dry solid lubricant to the wire surface, should be carried out such that the total reduction of diameter $\Sigma Rd$ at the hole die is in the range of 0.5 to 78%.

Drawing by means of the hole die, which precedes drawing by means of roller dies, should be applied to a steel stock wire having a diameter of about 2-8 mm and a surface roughness (Ra defined by JIS B0601-1994) no smaller than 0.3 µm measured in the lengthwise direction of the wire. This surface roughness is referred to as Ra[L] hereinafter. The stock wire should have adequate initial surface irregularities, which, after drawing, give a surface roughness necessary for lubricity (in drawing by means of roller dies that follows drawing by means of a hole die) and wire feedability at the time of welding. This will be mentioned later.

For drawing by means of a hole die to be able to successfully apply the dry solid lubricant to the surface of the drawn wire, it is necessary to take into account the kind and amount of the dry solid lubricant as well as the total reduction of diameter ascribed to drawing by means of a hole die, which is defined below as the ratio of the reduction of diameter due to drawing by means of a hole die to the reduction of diameter due to drawing by means of roller dies.

The reduction of wire diameter Rd (%) is defined as $$Rd(\%) = Dr(n)/(Di-Do) \times 100$$

where, Dr(n) is the reduction of wire diameter due to drawing at the nth die in the drawing step, Di (mm) is the diameter of the stock wire, and Do (mm) is the diameter of the finished wire.

If the hole die of interest is placed at the kth roller die, then the total reduction of diameter ascribed to drawing by means of the hole die is defined by $$\Sigma Rd(\%) = \Sigma Dr(k)/(Di-Do) \times 100 \ (k=1, 2, 3 \ldots)$$

k does not necessarily be consecutive numbers.

For example, if the drawing system shown in FIG. 2 is modified such that the first to fourth roller dies (210, 202, 203, and 204) in the primary drawing step (B) are replaced by four hole dies and the tenth roller die (404) in the secondary drawing step (C) is replaced by one hole die, then the total reduction of diameter ascribed to drawing by means of the hole dies is defined by $$\Sigma Rd(\%) = (Dr1 + Dr2 + Dr3 + Dr4 Dr10)/(Di-Do) \times 100$$

Moreover, in the case of roller dies, the total reduction of diameter ascribed to drawing by means of roller dies is defined by $$\Sigma Rd(\%) = (Dr1 + Dr2 + Dr3 + Dr4 Dr10)/(Di-Do) \times 100$$

k does not necessarily be consecutive numbers.

As shown in FIG. 5, more than one roller die 4a constitute a train of roller dies 4 for drawing. Therefore, the value of Dr(k) ascribed to roller dies is the difference between the diameter of the wire entering the kth train of roller dies and the diameter of the wire leaving the kth train of roller dies. The wire being drawn does not have a true round cross section, and hence the diameter of the wire is expressed in terms of the diameter of its circumscribed circle. This applies also to the wire drawn by the hole die.

The reduction of area of wire has long been used to evaluate the performance of continuous drawing by means of roller dies and hole dies which are arranged in-line. Unfortunately, it depends on the number of steps in drawing process (such as primary drawing and secondary drawing) and the number of steps in each continuous drawing process. Therefore, it sometimes exceeds 100%, making it impossible to sum up the reduction of area ascribed to each drawing die. This prevents accurate evaluation. By contrast, the reduction of diameter of wire helps one to design an adequate working ratio for the hole dies to apply the lubricant.

This embodiment of the present invention is characterized in that drawing by means of hole dies is accomplished in such a way that the sum of reduction of diameter ($\Sigma Rd$) is 0.5-78% regardless of whether a series of hole dies is arranged or a single hole die used. Drawing in this way by means of hole dies applies for good adhesion the dry solid lubricant to the wire surface as much as necessary for subsequent drawing by means of roller dies. In other words, applying the dry solid lubricant to the wire surface at the same time as drawing by means of the hole die obviates the necessity of newly applying the dry solid lubricant to the wire to be drawn subsequently by means of the roller dies.

To be more specific, the effect of keeping the sum of reduction of diameter ($\Sigma Rd$) within the range mentioned above is that the lubricant is tightly forced into the irregularities on the wire surface during drawing by means of hole dies and hence the drawn wire has approximately the same surface irregularities as those of the stock wire. As the result, the drawn wire has adequate surface irregularities tightly filled with the dry solid lubricant which helps drawing. Therefore, the surface of the wire drawn by means of hole dies retains as much tightly adhering lubricant as necessary for subsequent drawing by means of roller dies without the necessity of newly applying the dry solid lubricant. In addition, the coating film of the lubricant is uniformly formed in the circumferential direction of the wire.

Moreover, the surface of the wire drawn by means of hole dies has approximately the same surface roughness as the stock steel wire, and this surface roughness helps subsequent drawing by means of roller dies and retains the lubricant for feeding on the finished welding wire. Therefore, the lubricant for wire feeding uniformly and stably adheres to the wire in its lengthwise direction. As the result, the welding wire has good feedability.

If the sum of reduction of diameter (ΣRd) is less than 0.5%, the lubricant does not tightly adhere to the wire surface and uniformly spread in the circumferential direction of the wire even though the drawing conditions and the lubricant properties are adjusted. ΣRd=0 means that drawing is accomplished entirely by means of roller dies; in this case, the drawn wire does not have a true round cross section but has the advantage that it can be drawn even though the lubricant film is not uniform over the entire circumference.

On the other hand, if the sum of reduction of diameter (ΣRd) is more than 78%, the lubricant is excessively consumed in drawing by means of hole dies to such an extent that subsequent drawing by means of roller dies is impossible without newly applying the dry solid lubricant. Moreover, in this case, drawing is accomplished substantially by means of hole dies, and drawing in this manner is identical with the conventional drawing which is accomplished mainly by means of hole dies. The drawing speed in this manner is inevitably low, and hence it is impossible to achieve high-speed drawing in the entire process including drawing by means of roller dies in the later stage.

(Drawing by Means of Roller Dies)

The following is concerned with a preferred embodiment for drawing by means of roller dies.

In the case where the dry solid lubricant is applied to the wire surface in drawing by means of hole dies, it is not fundamentally necessary to newly apply the dry solid lubricant to the wire in subsequent drawing by means of roller dies. However, in the case where the dry solid lubricant is not applied to the wire surface in drawing by means of hole dies or only a minimum amount of the dry solid lubricant is applied in drawing by means of hole dies, it is permissible to apply the dry solid lubricant in drawing by means of roller dies in an amount that can be continuously removed in-line in the subsequent washing step.

(Apparatus for Drawing by Means of Roller Dies)

The following is concerned with a preferred apparatus for drawing by means of roller dies used in the present invention. (The apparatus will be referred to as the apparatus for drawing by means of roller dies.)

(Stiffness of the Frame of Roller Dies)

The following is concerned with the stiffness of the frame supporting roller dies.

The above-mentioned frame of integral type supporting roller dies plays an important role to accurately keep roller dies in position at the time of drawing. With low stiffness, the frame of integral type will readily deform and hence will not firmly support roller dies, with the result that rollers vibrate as they turn at the time of drawing. The vibrating rollers in turn vibrate the welding wire being drawn, causing it to come into contact intermittently with the groove of the roller. This contact leaves dents on the wire surface. The welding wire with such dents is poor in accuracy of diameter and shape and has an undesirably rough surface. This trouble tends to occur when a high-strength welding wire is drawn. So, the drawing of a high-strength welding wire is impossible at a high speed or possible only at a low speed.

This trouble can be avoided in the preferred embodiment of the present invention, which employs a stiff frame of integral type resistant to loads at the time of drawing. The stiff frame firmly supports roller dies and contributes to improvement in drawing speed and drawing accuracy even in the drawing of a high-strength welding wire.

Figure 6A:
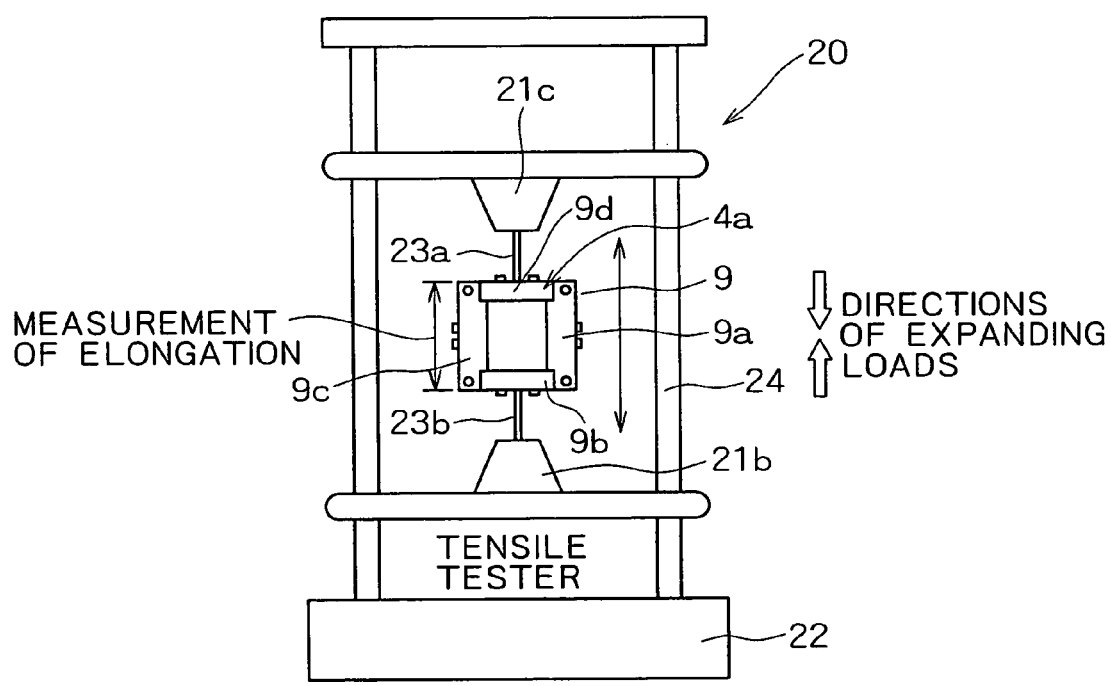
FIG. 6a is a front view showing the tensile test apparatus for the frame integral with the roller die.

The stiffness of the frame of integral type is measured by using a tensile testing machine (20) shown in FIG. 6(a). It is expressed in terms of amount of elongation, when tensile testing is performed only for the frame of integral type. Measurement in this way is simple and the result corresponds well to the speed and accuracy in the actual drawing of a high-strength welding wire.

Before measurement, the frame is removed from the drawing apparatus and then has the roller dies and bearing boxes removed from it. A tensile load of 10000 N (newton) is applied to the center of the frame so that the frame elongates, and the amount of elongation is measured. The direction in which the tensile load is applied is identical to that in which the load of wire is applied to the roller die. The amount of elongation measured in this way (for the frame alone and at the center of the frame) represents the maximum amount of deformation possible for the frame of integral type. It is to be noted that the frame has the roller dies and bearing boxes removed from it before measurement so as to eliminate their effect on the stiffness of the frame and to measure the stiffness of the frame alone which greatly affects the drawing of a high-strength welding wire.

Figure 6B:
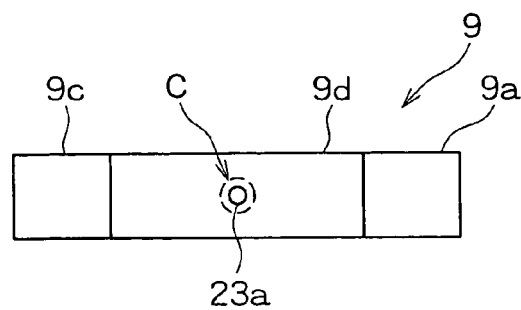

The tensile testing machine (20) shown in FIG. 6(a) is principally made up of a base 22, a frame 24 placed on the base 22, and tensile testers 21a and 21b which are perpendicular to the frame 24. This structure is basically identical to that of an ordinary tensile testing machine. The only difference is that the tensile specimen in an ordinary tensile testing machine is replaced by the frame of integral type for the drawing apparatus and the frame is fixed by bolts 23a and 23b attached to its upper and lower parts (9d and 9b), respectively, such that the bolts 23a and 23b pass through the center of the frame 9. Incidentally, the frame 9 of integral type being tested as shown in FIG. 6(a) is at the position which is turned 90° from the position shown in FIG. 3, so that the direction in which the load for testing is applied coincides with that in which the load to wire is applied. FIG. 6(b) is a plan view of the frame 9 of integral type. As shown in FIG. 6(b), the tensile load is applied to the center C of the frame 9d, which is at or near the upper and lower central axis. In the case where a bolt for position adjustment exists at the center C of the frame 9d, it may serve as the fixing bolt 23a for tensile test. If there exist no fixing bolts or bolt holes for tensile test, then it is necessary to make a new hole (at the center C of the frame 9d) into which the fixing bolt 23a for tensile test is inserted. The same shall apply to the frame 9b at the opposite side. In any case, the fixing bolt for tensile test should be thick and strong enough to withstand the tensile load of 10000 N, as a matter of course.

The amount of elongation of the frame is expressed by $L_1-L_0$, where $L_0$ denotes the length of the frame 9 (in the vertical axial direction) measured before load application, and $L_1$ denotes the length of the frame 9 measured after load application. As mentioned above, the amount of elongation of the frame 9 of integral type represents the maximum amount of deformation of the frame 9 of integral type. The lengths ($L_1$ and $L_0$) should be measured to accuracy of μm by using a micrometer, laser scale, dial gauge, strain gauge, or the like.

According to the present invention, the frame of integral type should preferably have a high stiffness indicated by an amount of elongation in the range of 20 to 150 μm which is measured by the tensile test. All of the frames for roller dies used for drawing should meet this requirement. If any one of the frames has an amount of elongation exceeding 150 μm, it lacks stiffness and strength to firmly hold roller dies at the time of drawing a high-strength welding wire. The result is dents on the wire being drawn, poor accuracy in wire diameter and shape, and roughened wire surface. A high-strength welding wire is more subject to this trouble. In such a situation, it is necessary to reduce the speed of drawing. In other words, it is impossible to achieve both objects of high-speed drawing and accurate drawing for a high-strength welding wire.

On the other hand, if the amount of elongation of the frame of integral type is less than 20 μm, the roller dies receive excessively large loads even in the case of mild steel solid wire or mild steel hoop FCW which can be drawn relatively easily. In this situation, even roller dies made of cemented carbide (such as WC—Co) decrease in fatigue strength, which leads to easy breakage and extremely shortened life. Therefore, the amount of elongation of the frame of integral type should be in the range of 20-150 μm.

(Structure of Drawing Apparatus with Roller Dies)

Figure 4:
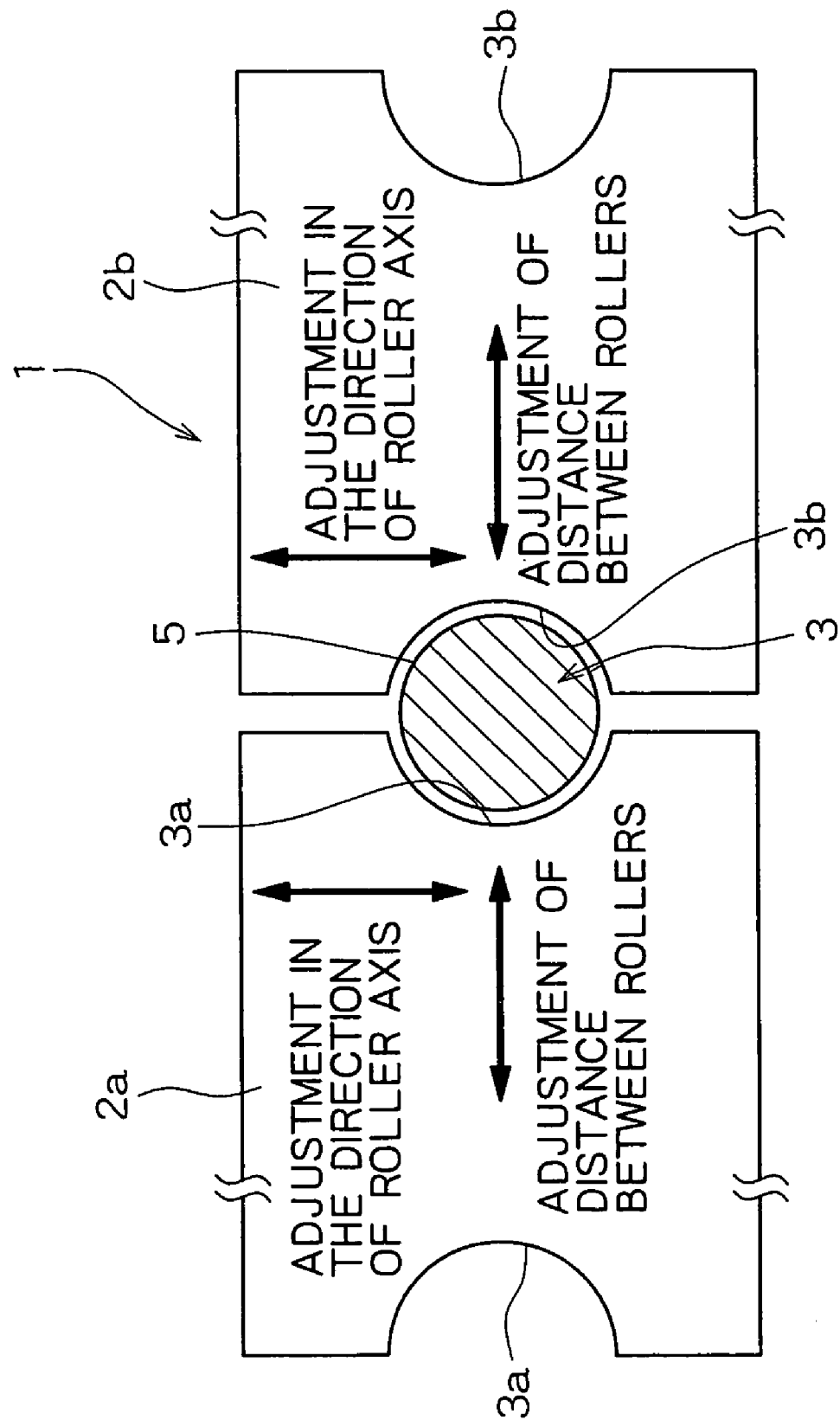
FIG. 4 is a front view showing the important parts of the apparatus shown in FIG. 3.

The following is concerned with the desirable structure of the drawing apparatus with roller dies, which is based on an assumption that the frame holding roller dies has a high stiffness as mentioned above. FIG. 3 is a front view of the drawing apparatus, and FIG. 4 is an enlarged front view of important parts of the roller dies for the drawing apparatus shown in FIG. 3.

In FIG. 3, there is shown a drawing apparatus 4a with roller dies, which is basically made up of roller dies 1, bearing boxes (or bearing covers) 7a, 7b, 7c, and 7d, bearing fixing beams 8a and 8b, and square frames of integral type 9a, 9b, 9c, and 9d. The square frames of integral type should preferably be made of steel with comparatively high strength, such as carbon steel for machine construction, alloy steel, stainless steel, and tool steel.

The roller die 1 consists of a pair of rollers 2a and 2b facing each other. These rollers 2a and 2b are supported on their shafts 6a and 6b, respectively, which are rotatably supported respectively by bearings (not shown) arranged inside the bearing boxes 7a, 7b, 7c, and 7d. The bearing boxes 7a and 7c are joined and fixed to the bearing fixing beam 8a, and the bearing boxes 7b and 7d are joined and fixed to the bearing fixing beam 8b. The bearing fixing beams 8a and 8b are fixed to the four frames 9a, 9b, 9c, and 9d through adjusting bolts mentioned later.

In FIG. 3, there are shown bolts 11a, 11b, 11c, and 11d, which are used to adjust the position of the roller die 1 in its axial direction (or vertical direction). There are also shown bolts 12a, 12b, 13a, 13b, 13c, and 13d, which are used to adjust the roller gap (or the distance between two rollers). These adjusting bolts are made up of pushing screws and pulling screws. The first two bolts are fixed to the bearing fixing beams 8a and 8b, and the second four bolts are fixed to the frames 9a, 9b, 9c, and 9d. Thus, these bolts adjust, through the bearing fixing beams and the bearing boxes fixed thereto, the position (in the direction of roller axis) of the rollers 2a and 2b and the roller gap for the welding wire being drawn. In this way it is possible to control the load which is applied to the welding wire by the roller die, the reduction of diameter, and the shape and diameter of the welding wire.

On the other hand, the frames 9a, 9b, 9c, and 9d, which hold and surround the roller die 1, are joined together by four bolts 10, so that they constitute a rectangular frame of integral part. The frame of integral type should have an approximately rectangular shape so that it supports the roller die 1 from four sides. In addition, there are shown four holes 27 that hold shafts to fix two or more sets of the drawing apparatus 4a arranged side by side in the drawing direction of the welding wire 5, as shown in FIG. 5. These holes 27 for fixing shafts are made at four corners of each frame of integral type (9a and 9c) so that they do not interfere with the construction and function of the drawing apparatus 4a.

FIG. 4 is an enlarged view of the roller die 1. The roller die 1 consists of a pair of rollers 2a and 2b facing each other. These rollers 2a and 2b have grooves 3a and 3b, respectively. These grooves 3a and 3b form the channel 3, which grabs the solid wire 5 to be drawn. The positions of the rollers 2a and 2b are adjusted in their axial direction (or in the vertical direction in the figure) by means of the bolts 11a, 11b, 11c, and 11d shown in FIG. 3. The roller gap (in the horizontal direction in the figure) is adjusted by means of the bolts 12a, 12b, 13a, 13b, 13c, and 13d shown in FIG. 3.

With the desired basic structure mentioned above, the rectangular frames of integral type 9a, 9b, 9c, and 9d will have the necessary stiffness and strength to firmly fix the roller die 1 at the time of drawing. Therefore, the rectangular frames of integral type 9a, 9b, 9c, and 9d retain their form even when a high-strength welding wire is drawn. In this way it is possible to increase the strength to fix the roller die 1 and to improve the drawing speed and accuracy for a high-strength welding wire.

The roller die 1 should be firmly fixed to the drawing apparatus 4a, and the strength (or stiffness) necessary for firm fixing is determined synergistically by the strength of each constituent (roller die 1, bearing box 7, bearing fixing beam 8, and rectangular frame 9), the strength with which the roller die 1 is fixed to the rectangular frame, and the strength of the rectangular frame. According to the present invention, the strength (stiffness) of the rectangular frame 9 of integral type, which has the predominant effect among the above-mentioned factors, is increased to a certain level so as to ensure the fixing strength for the roller die 1. Therefore, even though the drawing apparatus 4a has the desirable basic structure, the frame of integral type will lack stiffness and the roller die fixing strength at the time of drawing a high-strength welding wire, if the frame of integral type has such a low stiffness that the amount of its elongation exceeds 150 μm.

FIG. 5 shows how a plurality of the roller die drawing apparatus 4a are arranged in series for actual drawing of a welding wire 5. The thus arranged roller dies constitute the drawing apparatus 4. In the drawing apparatus 4 shown in FIG. 5, the identical four roller dies 4a are arranged side by side in such a manner that one roller die is turned 90° relative to its adjacent roller die. These roller dies 4a are fixed to the fixing plate 29 and united to the drawing apparatus 4 by means of the fixing shafts 28a and 28b passing through the holes 27 (shown in FIG. 3) for the fixing shaft of each roller die 4a. The fixing plate 29 is an L-shaped member, with one leg supporting the bottom of the roller dies 4a. Incidentally, in FIG. 5, the drawing direction is from right to left.

(Material of Roller Die)

The roller die 1 (or rollers 2a and 2b) used in the present invention should preferably be made of cemented carbide. Otherwise, it will be poor in fatigue resistance, easily breakable, and very short in life, particularly in high-speed drawing of a high-strength welding wire. The cemented carbide includes those derived from WC, TiC, and TiCN. The cemented carbide may contain any of ZrC, HfC, TaC, NbC, VC, $Cr_3C_2$, etc. dispersed therein, and also contain Co and/or Ni as a binder for sintering.

The cemented carbide desirable for the roller die 1 used in the present invention is one which is composed of fine WC powder (having a particle diameter of 0.1-20 μm) sintered with Co alone or Co and Ni as a binder. The roller die made of WC—Co cemented carbide has a high hardness and stiffness and keeps its strength even at the time of drawing a high-strength welding wire. Moreover, it produces a good-looking welding wire after drawing, which can be smoothly fed to the welding machine, and it permits stable drawing without wear on the surface of the roller groove for a long period of time.

The foregoing shall apply to the hole die used in the present invention. Therefore, the above-mentioned hole die used in the present invention should also be made preferably of cemented carbide, particularly WC—Co cemented carbide. Alternatively, it is also possible to use a diamond hole die which is superior in abrasion resistance.

(Steps After Drawing by Means of Roller Dies)

The following is concerned with steps to be carried out in-line after drawing by means of roller dies in the drawing step (C).

(Dry Finish Drawing)

After the secondary drawing (C) by means of roller dies, the drawn wire undergoes the dry finish drawing (D) by means of a hole die 501 for improvement in shape accuracy. This drawing step is intended to improve the shape (such as roundness) with a small amount of reduction in diameter. After finish drawing, the drawn wire is finally wound up into a coil as shown in FIG. 2. The thus finished welding wire 110 should have a good shape accuracy which affects wire feedability and the ease with which the wire 110 is wound onto a wire spool or placed in a pail pack. The final finish drawing by means of the hole die 501, which is performed on the wire which has been drawn by means of the roller dies until the drawn wire has a diameter specified for the product, does not affect the performance (such as speed and continuity) of the entire drawing process by means of roller dies, because drawing by means of the hole die is extremely limited in the amount of working. The finish drawing (D) by means of the hole die may optionally be omitted from the secondary drawing step as a matter of course.

The drawn wire undergoes the washing step 108, which is mentioned below.

The washing step 108 is intended to continuously remove in-line the dry solid lubricant for drawing which remains on the surface of the drawn wire. This washing step 108 should be so accomplished as to remove not only the drawing lubricant adhering to the wire surface but also the drawing lubricant which has been forced into wire surface irregularities resulting from drawing. On the other hand, the wire surface irregularities with small pits should preferably remain after the washing step 108. Such small pits remaining on the wire surface function as reservoirs of lubricant for wire feeding. Consequently, the washing step 108, which may be physical or chemical one, should preferably be accomplished such that small pits remain on the wire surface. Washing in this manner can be accomplished by using a simple washing bath containing no organic detergent and acid or alkali, if the lubricant has the composition as mentioned above.

The washing step 108 is followed by the step 109 of applying a lubricant for wire feeding. This step is intended to apply a lubricant for smooth wire feeding to the wire surface in-line continuously. The lubricant is received by small pits on the wire surface. The lubricant for wire feeding should preferably be composed of a base oil and a solid lubricant. Uniform thin application of lubricant to the fast-moving wire may be accomplished by electrostatic deposition.

Lubricant (or lubricating oil) is essential for smooth wire feeding. However, it should be used in a minimum amount because it liberates hydrogen to form blow holes in the weld zone. A desirable lubricant is one which produces good wire feedability when used in a small amount. For this reason, the base oil should be one or more than one species selected from vegetable oil, animal oil, mineral oil, and synthetic oil, and the lubricant (high pressure lubricant) should be one or more than one species selected from $MoS_2$, $WS_2$, ZnS, and graphite.

The invention will be described in more detail with reference to the following examples.

EXAMPLE 1

This example demonstrates the production of a welding solid wire by the process shown in FIG. 2. This process consists of the primary drawing step (B) and the secondary drawing step (C), both by means of roller dies. The two drawing steps made a high-strength stock wire (5.5 mm in diameter) into a welding wire (1.2 mm in diameter). Before the primary drawing step (B), the stock wire was coated with a dry solid lubricant for drawing. Before the secondary drawing step (C), the half drawn wire was also coated with a dry solid lubricant for drawing. Incidentally, this example did not include the step of finish drawing by means of the hole die 501 (shown in FIG. 2) after drawing.

The drawn wire (which has the diameter of the product wire) underwent the washing step (E) by means of a simple washing bath 108 containing no organic detergent, acid or alkali, so that the wire surface was cleaned of residual lubricant for drawing. In the subsequent oiling step (E), the washed wire was coated with a lubricant for wire feeding. These procedures were carried out in-line. Finally, the finished wire (1.2 mm in diameter) was wound up into a coil 110. Thus there was obtained the desired product (F), which is a welding solid wire free of copper plating.

The effect of lubricant on drawability and wire characteristics was measured by varying the composition of the lubricant for drawing by means of roller dies (assuming that the same lubricant is used in the primary and secondary drawing steps). The results are shown in Table 1.

The stock wire was a high-strength steel wire having a tensile strength of 500 MPa and a chemical composition corresponding to JIS Z3312 YGW12. The roller die for drawing was the drawing apparatus 4 shown in FIGS. 3 and 5. Roller dies of the same structure were used throughout the entire drawing process. All the roller dies were made of WC—Co cemented carbide mentioned above. The lubricant for wire feeding was composed of 85 mass % of synthetic oil and 15 mass % of $MoS_2$. It was applied in an amount of 1.0 g per 10 kg of wire. Incidentally, $MoS_2$ produces its effect of lubrication with a content ranging from 5 to 25%.

Wire drawing was carried out under the same conditions, while the lubricant for drawing was varied in composition as shown in Table 1, to see how the composition of lubricant affects the drawability in drawing by means of roller dies and the characteristic properties of welding solid wire.

In Table 1 (and Tables 2 to 4 given later), the symbols ST-Na, ST-K, and ST-Ca under the column of lubricant for drawing stand for sodium stearate soap, potassium stearate soap, and calcium stearate soap, respectively. Also, GF stands for graphite and A denotes a softening point adjusting agent which is a 1:1 mixture of sodium nitrite and sodium phosphate.

The lubricant for drawing varies in composition as follows.
(1) composed of 100 mass % of soap.
(2) composed of 65 mass % of soap, 12 mass % of softening point adjusting agent, and 23 mass % of high pressure lubricant (any of $MoS_2$, $WS_2$, BN, ZnS, and GF)

(3) composed of 85 mass % of soap and 15 mass % of high pressure lubricant.
(4) composed of 75 mass % of soap and 25 mass % of softening point adjusting agent.

In this example, test drawing was carried out to see how the frame of integral type affects drawing differently according as it varies in stiffness. For this purpose, one set of roller dies 405 (at which the drawing speed is highest in the secondary drawing step) was replaced by another set which has a different stiffness. In a particular set of roller dies, the frames for four roller dies (as shown in FIG. 5) have the same stiffness. The stiffness of the frame of integral type is represented in terms of the amount of elongation (μm) measured by using the tensile testing machine shown in FIG. 6. All other frames for roller dies (drawing apparatus) in the primary and secondary drawing steps have the same stiffness (or 60 μm in elongation). This condition was also employed in Example 2 given later.

The drawing performance of the roller dies was evaluated by observing how stable drawing was. In this test, the drawing rate in the primary drawing step was 1700 kg/h (or 800 m/min) and the drawing rate in the secondary drawing step was 500 kg/h (or 1000 m/min). In Table 1, the results are indicated by ○, Δ, or ×, with ○ meaning that stable drawing was possible at the specified drawing rate, Δ meaning that stable drawing was only possible at a reduced drawing rate, and × meaning that stable drawing was almost impossible. Incidentally, the wires with poor drawing performance in the primary drawing step (particularly those with a rough surface) did not undergo the secondary drawing step.

The wire surface was examined for dents by visual observation during or after drawing by means of roller dies. The results were rated according to the following criterion. ○ (no dents), Δ (some dents), and × (many dents).

The welding wire, which was drawn at a rate of 500 kg/h in the secondary drawing step, was tested for wire feedability and arc stability in lap fillet welding for mild steel plates (2.4 mm thick).

The wire feedability was evaluated by using a commercial wire feeder connected to a $CO_2$ gas shielded welder. The wire feed was intentionally bent twice over a distance of 6 meters. The result was rated according to the following criterion.
○ (wire feeding was continuous)
Δ (wire feeding was interrupted once or twice although welding operation was not interrupted)
× (wire feeding was interrupted frequently and welding operation was also interrupted)

Good wire feeding suggests that the welding wire has an accurate dimension and shape (true roundness).

The arc stability of the welding wire was evaluated by visually observing the arcs during welding operation. The results were rated according to the following criterion.
○ (stable arcs throughout welding operation)
Δ (occasionally unstable arcs)
×(constantly unstable arcs)

Those wire samples which were poor in drawability in the primary drawing step and hence did not undergo the secondary drawing step are marked with "–" in Table 1.

Welding was carried out under the following conditions.
Welding current: 260 A
Welding voltage: 32 V
Welding speed: 70 cm/min
$CO_2$ shielding gas: 25 L/min The results of welding are shown in Table 1. Incidentally, the same welding conditions as above were also employed in Examples 2 and 3.

As shown in Table 1, Working Samples Nos. 1 to 19 were prepared by drawing with the help of any of the lubricants specified in the present invention, which is composed of sodium stearate soap or potassium stearate soap, a softening point adjusting agent A, and/or a high pressure lubricant selected from $MoS_2$, $WS_2$, BN, ZnS, and GF. By contrast, Comparative Samples Nos. 20 to 25 were prepared by drawing with the help of any of the lubricants which contain neither sodium stearate soap nor potassium stearate soap. It is apparent that Working Samples are superior to Comparative Samples in both drawability (by roller dies for welding sold wire free of copper plating) and wire feedability (as a measure indicating the accuracy of wire shape). This suggests that the lubricant specified in the present invention permits the welding wire to be drawn at a high speed accurately without dents. It is also shown that the lubricant for drawing is substantially removed in-line or the lubricant remaining in a very small amount has no adverse effect on welding performance.

Lubricants in Samples Nos. 1 and 2 are stearate soap used alone and hence have a low softening point. For this reason, these samples are poorer in drawability at high-speed drawing (1700 kg/h or 800 m/min) in the primary drawing step than other samples.

By contrast, Sample No. 24 for comparison, which was drawn with the help of calcium stearate soap, was good in drawability at high-speed drawing (1700 kg/h or 800 m/min) in the primary drawing step; however, it was poor in wire feedability and welding performance as evidenced by many defects. The reason for this is that calcium stearate (as a lubricant for drawing) is not completely removed in-line, and residual lubricant adversely affects feedability and welding performance. The foregoing convincingly suggests that the lubricant for drawing in the present invention should be sodium stearate soap or potassium stearate soap.

Samples Nos. 20 to 23 for comparison, which were drawn with the help of a lubricant not containing sodium stearate soap or potassium stearate soap, are poor in high-speed drawability (at 1700 kg/h or 800 m/min) in the primary drawing step, as evidenced by dents. They were so poor in drawability in the primary drawing step that they were incapable of drawing in the secondary drawing step.

Sample No. 19 was poorer in drawability than Sample 5 although both of them were drawn with the help of the lubricant specified in the present invention. The reason for this is that the former was drawn by means of roller dies whose frame is not sufficiently stiff (with an elongation of 150 μm, which is the upper limit of elongation specified in the present invention), whereas the frame for roller dies used for sample No. 5 has a high stiffness, with a smaller amount of elongation. Sample No. 19 suffered wire vibration in the primary and secondary drawing steps, although the degree of vibration was not so high as to cause dents. Sample No. 25 for comparison, which was drawn by means of roller dies whose frame suffered elongation more than 160 μm (in excess of the upper limit), was so poor in drawability (with dents) in the primary drawing step that it was incapable of drawing in the secondary drawing step.

On the other hand, Sample No. 18, which was drawn by means of roller dies whose frame has an elongation of only 20 μm, required the drawing speed to be reduced on account of the excessively high load on the roller dies which would reduce the fatigue strength of roller dies and break the surface of roller dies made of WC—Co cemented carbide. Therefore, it was limited in the drawing speed that permits stable drawing.

drawing by means of roller dies and also on the characteristic properties of the thus obtained welding solid wire was examined in the same way as in Example 1. The results are shown in Table 2. The secondary drawing by means of roller dies was accomplished in such a way that the amount of drawing is 500 kg/h and the drawing speed is 100 m/min, as in Example 1.

Wire drawing was also accomplished with the help of the same drawing lubricant having the composition specified in

TABLE 1

| | | | | | | Drawing by means of roller dies | | | | | | | | |
|---|---|---|---|---|---|---|---|---|---|---|---|---|---|---|
| | | Stock | | | | | | | | Secondary | | Welding performance | | |
| | | wire | Composition | | Elongation | Primary drawability | | | drawability | | | | | Arc |
| Sample | No. | diameter (mm) | of lubricant for drawing | Σrd (%) | of frame (μm) | 850 kg/h | 1700 kg/h | dents | 200 kg/h | 400 kg/h | dents | Wire Dia. (mm) | Wire feedability | stability |
| Working sample | 1 | 5.5 | ST-Na | 100.0 | 60 | ○ | △ | ○ | ○ | △ | ○ | 1.2 | △ | ○ |
| | 2 | 5.5 | ST-Na, MoS$_2$ | 100.0 | 60 | ○ | △ | ○ | ○ | △ | ○ | 1.2 | △ | ○ |
| | 3 | 5.5 | ST-Na, GF | 100.0 | 60 | ○ | ○ | ○ | ○ | △ | ○ | 1.2 | ○ | ○ |
| | 4 | 5.5 | ST-Na, MoS$_2$, GF | 100.0 | 60 | ○ | ○ | ○ | ○ | △ | ○ | 1.2 | ○ | ○ |
| | 5 | 5.5 | ST-Na, BN | 100.0 | 60 | ○ | ○ | ○ | ○ | △ | ○ | 1.2 | ○ | ○ |
| | 6 | 5.5 | ST-Na, A | 100.0 | 60 | ○ | ○ | ○ | ○ | ○ | ○ | 1.2 | ○ | ○ |
| | 7 | 5.5 | ST-Na, MoS$_2$, A | 100.0 | 60 | ○ | ○ | ○ | ○ | ○ | ○ | 1.2 | ○ | ○ |
| | 8 | 5.5 | ST-Na, WS$_2$, A | 100.0 | 60 | ○ | ○ | ○ | ○ | ○ | ○ | 1.2 | ○ | ○ |
| | 9 | 5.5 | ST-Na, MoS$_2$, GF, A | 100.0 | 60 | ○ | ○ | ○ | ○ | ○ | ○ | 1.2 | ○ | ○ |
| | 10 | 5.5 | ST-Na, ZnS, A | 100.0 | 60 | ○ | ○ | ○ | ○ | ○ | ○ | 1.2 | ○ | ○ |
| | 11 | 5.5 | ST-Na, MoS$_2$, GF, BN, A | 100.0 | 60 | ○ | ○ | ○ | ○ | ○ | ○ | 1.2 | ○ | ○ |
| | 12 | 5.5 | ST-K | 100.0 | 60 | ○ | ○ | ○ | ○ | △ | ○ | 1.2 | ○ | ○ |
| | 13 | 5.5 | ST-K, A | 100.0 | 60 | ○ | ○ | ○ | ○ | ○ | ○ | 1.2 | ○ | ○ |
| | 14 | 5.5 | ST-K, MoS$_2$, GF | 100.0 | 60 | ○ | ○ | ○ | ○ | △ | ○ | 1.2 | ○ | ○ |
| | 15 | 5.5 | ST-K, MoS$_2$, A | 100.0 | 60 | ○ | ○ | ○ | ○ | ○ | ○ | 1.2 | ○ | ○ |
| | 16 | 5.5 | ST-K, MoS$_2$, GF, A | 100.0 | 60 | ○ | ○ | ○ | ○ | ○ | ○ | 1.2 | ○ | ○ |
| | 17 | 5.5 | ST-K, MoS$_2$, ZnS, A | 100.0 | 60 | ○ | ○ | ○ | ○ | ○ | ○ | 1.2 | ○ | ○ |
| | 18 | 5.5 | ST-Na, MoS$_2$, GF, BN, A | 100.0 | 20 | ○ | △ | ○ | ○ | ○ | ○ | 1.2 | ○ | ○ |
| | 19 | 5.5 | ST-Na, MoS$_2$, ZnS, A | 100.0 | 150 | ○ | △ | △ | ○ | △ | △ | 1.2 | △ | ○ |
| Comparative sample | 20 | 5.5 | MoS$_2$, GF | 100.0 | 60 | X | X | X | X | — | — | 1.2 | X | X |
| | 21 | 5.5 | WS$_2$, GF | 100.0 | 60 | X | X | X | X | — | — | 1.2 | X | X |
| | 22 | 5.5 | MoS$_2$, BN | 100.0 | 60 | X | X | X | X | — | — | 1.2 | X | X |
| | 23 | 5.5 | MoS$_2$, GF, BN | 100.0 | 60 | X | X | X | X | — | — | 1.2 | X | X |
| | 24 | 5.5 | ST-Ca, MoS$_2$, GF, BN | 100.0 | 60 | ○ | ○ | ○ | ○ | ○ | ○ | 1.2 | △ | X |
| | 25 | 5.5 | ST-Na, MoS$_2$, GF, BN | 100.0 | 160 | △ | X | X | — | — | — | 1.2 | — | — |

EXAMPLE 2

Samples of welding solid wires (free of copper plating), 1.2 mm in diameter, were prepared from high-strength stock wires, 5.5-2.4 mm in diameter, under the same conditions as in Example 1, except that hole dies were placed in the first drawing step (B) for continuous drawing such that ΣRd was 50.7% (sum of reduction in diameter). The stock wire was coated with a dry solid lubricant before the primary drawing step (B) with hole dies. The half drawn wire was not coated again with the dry solid lubricant in the secondary drawing step (C) with roller dies. In other words, drawing in the secondary drawing step (C) was accomplished with the help of residual lubricant only. The primary drawing step (B) relies on four hole dies of WC—Co cemented carbide arranged in series and three roller dies arranged in series thereafter.

The stock wires were drawn by means of the hole dies under the same condition. The effect of the drawing lubricant (which varies in composition) on drawability in the secondary the present invention. This lubricant is composed of soap (ST-Na), softening point adjusting agent (A), and high pressure lubricant (MoS$_2$). Drawing by means of the hole dies was varied so that ΣRd (sum of reduction in diameter) varies. The effect of drawing in this manner on the drawability in the second drawing step with roller dies and the characteristic properties of the welding solid wire was examined in the same way as in Example 1. The results are shown serially in Tables 3 and 4. Incidentally, the drawing step to prepare the samples shown in Tables 3 and 4 varies in the number of dies and the arrangement of roller dies (R) and hole dies (D) as shown.

Thus, Tables 3 and 4 show the number of dies and the arrangement of roller dies (R) and hole dies (D) used in each drawing step. For example, if the primary drawing employs seven dies and the secondary drawing employs eight dies, then this arrangement is expressed as "primary drawing 7+secondary drawing 8". If drawing is accomplished in a single drawing step (instead of divided drawing steps), then it is expressed as "single drawing step". Moreover, the arrangement of dies in each drawing step in terms of R's and D's, R representing a train of roller dies (as shown in FIG. 5) and D representing one hole die. The arrangement of R's and D's corresponds to the arrangement of the roller dies and hole dies. For example, RRRRRRR (seven R's) denotes that the primary drawing step involves seven trains of roller dies, and RRRRRRRD (seven R's and one D) denotes that the secondary drawing step involves seven trains of roller dies and one hole die placed last (for finish drawing to improve the wire shape). Also, in Tables 3 and 4, the last D in the character string representing the secondary drawing step or single drawing step denotes the hole die 501 for finish drawing as shown in FIG. 2, and this character string denotes finish drawing with a hole die.

The drawing performance of the roller dies shown in Tables 2 to 4 and the characteristic properties of the finished welding wire were evaluated in the same way as in Example 1.

As shown in Table 2, Samples Nos. 26 to 44 were obtained by drawing with the help of a lubricant composed of sodium stearate soap or potassium stearate soap, a softening point adjusting agent, and/or a high pressure lubricant selected from $MoS_2$, $WS_2$, BN, ZnS, and GF. As compared with Samples Nos. 45 to 48 for comparison, which were drawn with the help of a lubricant not containing sodium stearate soap or potassium stearate soap, Samples Nos. 26 to 44 are better in drawability (by means of roller dies) and wire feedability as a measure of wire shape accuracy and welding performance. This result suggests that the drawing lubricant having the composition specified in the present invention permits high-speed drawing as evidenced by the good wire shape and the absence of dents on the wire surface. This result suggests also that the drawing lubricant having the composition specified in the present invention does not adversely affect the welding performance even though it is not completely removed in-line but remains in a very small amount.

Samples Nos. 26 and 27, which were drawn with the help of stearate soap alone as the lubricant which has a low softening point, are poor in drawability at high-speed drawing (at 500 kg/h or 1000 m/min).

By contrast, Sample No. 49 for comparison, which was prepared by drawing with the help of calcium stearate soap is good in drawability in the secondary drawing (at 500 kg/h or 1000 m/min). However, it is poor in wire feedability and welding performance (with many defects in the weld zone). The reason for this is that the calcium stearate is not completely removed in-line and its residues adversely affect the welding performance.

Samples Nos. 45 to 48 for comparison, which were prepared by drawing with the help of a lubricant not containing sodium stearate or potassium stearate, are poor in drawability, as evidenced by dents, at high-speed drawing (at 1700 kg/h or 800 m/min) in the primary drawing step. The drawn wire obtained in the primary drawing step had such a poor quality that it was incapable of drawing in the secondary drawing step.

The result mentioned above is similar to that in Example 1. These results convincingly suggest that the lubricant for drawing in the present invention should be sodium stearate soap or potassium stearate soap. In addition, the results are the same for any welding wire prepared from the stock wire having a diameter of 5.5 mm or 2.2 mm.

Sample No. 44 was poorer in drawability than Sample 30 although both of them were drawn with the help of the lubricant specified in the present invention. The reason for this is that the former was drawn by means of roller dies whose frame is not sufficiently stiff (with an elongation of 150 μm, which is the upper limit of elongation specified in the present invention), whereas the frame for roller dies used for sample No. 30 has a high stiffness, with a smaller amount of elongation. Sample No. 44 suffered wire vibration in the primary and secondary drawing steps, although the degree of vibration was not so high as to cause dents. Sample No. 50 for comparison, which was drawn by means of roller dies whose frame suffered elongation more than 160 μm (in excess of the upper limit), was so poor in drawability (with dents) in the primary drawing step that it was incapable of drawing in the secondary drawing step.

On the other hand, Sample No. 43, which was drawn by means of roller dies whose frame has an elongation of only 20 μm, required the drawing speed to be reduced on account of the excessively high load on the roller dies which would reduce the fatigue strength of roller dies and break the surface of roller dies made of WC—Co cemented carbide. Therefore, it was limited in the drawing speed that permits stable drawing.

It is apparent from Tables 3 and 4 that Samples Nos. 51 to 77, in which ΣRd (sum of reduction of diameter in drawing by means of hole dies) is within the range of 0.5 to 78%, are superior in both drawability (by means of roller dies) and wire characteristics to Samples Nos. 78 to 84, in which ΣRd (defined as above) is in excess of 78%. This result suggests that the dry solid lubricant necessary for drawing by means of roller dies remains satisfactorily (in terms of amount and adhesion) on the wire surface after drawing by means of hole dies.

Samples Nos. 55 and 69 are poorer than other samples (under the same conditions) in drawability at high-speed drawing (500 kg/h) in the secondary drawing, because they have a high value of ΣRd equal to or close to the upper limit. This result suggests that, in Samples Nos. 55 and 69, the dry solid lubricant necessary for drawing by means of roller dies does not remain satisfactorily (in terms of amount and adhesion) on the wire surface after drawing by means of hole dies.

By contrast, Samples Nos. 78 to 84, in which ΣRd exceeds 78%, required such a large amount of dry solid lubricant at the time of drawing by means of hole dies that they lacked the dry solid lubricant for drawing by means of roller dies. It is understood, therefore, that ΣRd (sum of reduction of diameter in drawing by means of hole dies) greatly affects the amount and adhesion of the dry solid lubricant necessary for the secondary drawing by means of roller dies if the drawing by means of hole dies is used to apply the lubricant for drawing by means of roller dies. In addition it is also understood that the desired amount and adhesion of the dry solid lubricant necessary for drawing by means of roller dies are achieved if ΣRd is lower than 78%.

It is also apparent from Table 4 that Sample No. 85 was drawn to the finished wire substantially by the primary drawing with hole dies, with ΣRd being 100.0%. Therefore, it did not undergo the secondary drawing (at 500 kg/h). The reason for this is that drawing by means of hole dies is slower than drawing by means of roller dies.

The result mentioned above is similar to that in Example 1 and that shown in Table 2 above. These results convincingly suggest that the lubricant for drawing in the present invention should be sodium stearate soap or potassium stearate soap. In addition, the results are the same for any welding wire prepared from the stock wire having a diameter of 5.5 mm, 3.2 mm, 2.8 mm, or 2.4 mm.

TABLE 2

| | Sample | No. | Stock wire diameter (mm) | Composition of lubricant for drawing | Drawing by hole dies ΣRd (%) | Drawing by roller dies Σrd (%) | Frame elongation (μm) | Drawability Max. drawing speed | Drawability Stable drawing amount | dents | Wire dia. (mm) | Welding performance Wire feedability | Welding performance Arc stability |
|---|---|---|---|---|---|---|---|---|---|---|---|---|---|
| Working sample | | 26 | 5.5 | ST-Na | 50.7 | 49.3 | 80 | ○ | Δ | ○ | 1.2 | ○ | ○ |
| | | 27 | 5.5 | ST-K | 50.7 | 49.3 | 80 | ○ | Δ | ○ | 1.2 | ○ | ○ |
| | | 28 | 5.5 | ST-Na, MoS$_2$ | 50.7 | 49.3 | 80 | ○ | Δ | ○ | 1.2 | ○ | ○ |
| | | 29 | 5.5 | ST-Na, MoS$_2$, ZnS | 50.7 | 49.3 | 80 | ○ | Δ | ○ | 1.2 | ○ | ○ |
| | | 30 | 5.5 | ST-Na, MoS$_2$, GF, BN | 50.7 | 49.3 | 80 | ○ | Δ | ○ | 1.2 | ○ | ○ |
| | | 31 | 5.5 | ST-Na, MoS$_2$, A | 50.7 | 49.3 | 80 | ○ | ○ | ○ | 1.2 | ○ | ○ |
| | | 32 | 5.5 | ST-Na, BN | 50.7 | 49.3 | 80 | ○ | Δ | ○ | 1.2 | ○ | ○ |
| | | 33 | 5.5 | ST-Na, WS$_2$, A | 50.7 | 49.3 | 80 | ○ | ○ | ○ | 1.2 | ○ | ○ |
| | | 34 | 5.5 | ST-Na, GF, A | 50.7 | 49.3 | 80 | ○ | ○ | ○ | 1.2 | ○ | ○ |
| | | 35 | 5.5 | ST-K, A | 50.7 | 49.3 | 80 | ○ | ○ | ○ | 1.2 | ○ | ○ |
| | | 36 | 5.5 | ST-K, MoS$_2$ | 50.7 | 49.3 | 80 | ○ | Δ | ○ | 1.2 | ○ | ○ |
| | | 37 | 5.5 | ST-K, MoS$_2$, GF | 50.7 | 49.3 | 80 | ○ | Δ | ○ | 1.2 | ○ | ○ |
| | | 38 | 2.2 | ST-Na, MoS$_2$, ZnS | 50.7 | 49.3 | 80 | ○ | Δ | ○ | 1.2 | ○ | ○ |
| | | 39 | 2.2 | ST-Na, A | 50.7 | 49.3 | 80 | ○ | ○ | ○ | 1.2 | ○ | ○ |
| | | 40 | 2.2 | ST-Na, GF, A | 50.7 | 49.3 | 80 | ○ | ○ | ○ | 1.2 | ○ | ○ |
| | | 41 | 2.2 | ST-Na, MoS$_2$, A | 50.7 | 49.3 | 80 | ○ | ○ | ○ | 1.2 | ○ | ○ |
| | | 42 | 2.2 | ST-Na, BN, A | 50.7 | 49.3 | 80 | ○ | ○ | ○ | 1.2 | ○ | ○ |
| | | 43 | 2.2 | ST-Na, MoS$_2$, A | 50.7 | 49.3 | 20 | ○ | Δ | ○ | 1.2 | ○ | ○ |
| | | 44 | 2.2 | ST-Na, MoS$_2$, A | 50.7 | 49.3 | 150 | ○ | Δ | Δ | 1.2 | ○ | ○ |
| Comparative sample | | 45 | 5.5 | MoS$_2$, GF | 50.7 | 49.3 | 80 | X | X | X | 1.2 | X | X |
| | | 46 | 5.5 | WS$_2$, GF | 50.7 | 49.3 | 80 | X | X | X | 1.2 | X | X |
| | | 47 | 5.5 | MoS$_2$, BN | 50.7 | 49.3 | 80 | X | X | X | 1.2 | X | X |
| | | 48 | 5.5 | MoS$_2$, GF, BN | 50.7 | 49.3 | 80 | X | X | X | 1.2 | X | X |
| | | 49 | 5.5 | ST-Ca | 50.7 | 49.3 | 80 | ○ | ○ | ○ | 1.2 | Δ | X |
| | | 50 | 5.5 | ST-Na, MoS$_2$, GF | 50.7 | 49.3 | 160 | X | X | X | 1.2 | — | — |

TABLE 3

| Sample | No. | Stock wire dia. (mm) | Drawing steps Number of dies in each step * | Drawing steps Arrangement of dies in each step ** | Composition of lubricant for drawing | Drawing by hole dies ΣRd (%) | Drawing by roller dies Σrd (%) | Frame elongation (μm) | Drawability Max. drawing speed | Drawability Stable drawing amount | dents | Wire dia. (mm) | Welding performance Wire feedability | Welding performance Arc stability |
|---|---|---|---|---|---|---|---|---|---|---|---|---|---|---|
| Working sample | 51 | 5.5 | I (7) + II (8) | 7R:7R,1D | ST-Na, MoS$_2$, A | 1.9 | 98.1 | 80 | ○ | ○ | ○ | 1.2 | ○ | ○ |
| | 52 | 5.5 | I (7) + II (8) | 1D,6R:7R,1D | ST-Na, MoS$_2$, A | 14.9 | 85.1 | 80 | ○ | ○ | ○ | 1.2 | ○ | ○ |
| | 53 | 5.5 | I (7) + II (8) | 4D,3R:7R1D | ST-Na, MoS$_2$, A | 50.7 | 49.3 | 80 | ○ | ○ | ○ | 1.2 | ○ | ○ |
| | 54 | 5.5 | I (7) + II (8) | 4D,3R:6R,2D | ST-Na, MoS$_2$, A | 53.0 | 47.0 | 80 | ○ | ○ | ○ | 1.2 | ○ | ○ |
| | 55 | 5.5 | I (7) + II (8) | 7D:6R,2D | ST-Na, MoS$_2$, A | 76.3 | 23.7 | 80 | ○ | Δ | ○ | 1.2 | ○ | ○ |
| | 56 | 5.5 | I (7) + II (9) | 3D,4R:7R,2D | ST-Na, MoS$_2$, A | 50.1 | 49.9 | 80 | ○ | ○ | ○ | 0.9 | ○ | ○ |
| | 57 | 5.5 | I (7) + II (9) | 4D,3R:8R,1D | ST-Na, MoS$_2$, A | 60.9 | 39.1 | 80 | ○ | ○ | ○ | 0.9 | ○ | ○ |
| | 58 | 5.5 | I (7) + II (6) | 7R:5R,1D | ST-Na, MoS$_2$, A | 1.9 | 98.1 | 80 | ○ | ○ | ○ | 1.2 | ○ | ○ |
| | 59 | 5.5 | I (7) + II (6) | 1D,6R:5R,1D | ST-Na, MoS$_2$, A | 14.2 | 85.8 | 80 | ○ | ○ | ○ | 1.2 | ○ | ○ |
| | 60 | 5.5 | I (7) + II (6) | 3D,4R:5R,1D | ST-Na, MoS$_2$, A | 38.8 | 61.2 | 80 | ○ | ○ | ○ | 1.2 | ○ | ○ |
| | 61 | 5.5 | I (7) + II (6) | 4D,3R:5R,1D | ST-Na, MoS$_2$, A | 50.0 | 50.0 | 80 | ○ | ○ | ○ | 1.2 | ○ | ○ |
| | 62 | 5.5 | I (7) + II (6) | 3D,4R:4R,2D | ST-Na, MoS$_2$, A | 40.7 | 59.3 | 80 | ○ | ○ | ○ | 1.2 | ○ | ○ |
| | 63 | 5.5 | I (7) + II (6) | 3D,4R:1D,3R,2D | ST-Na, MoS$_2$, A | 50.0 | 50.0 | 80 | ○ | ○ | ○ | 1.2 | ○ | ○ |
| | 64 | 5.5 | I (7) + II (6) | 5D,2R:1D,3R,2D | ST-Na, MoS$_2$, A | 71.0 | 29.0 | 80 | ○ | ○ | ○ | 1.2 | ○ | ○ |

TABLE 3-continued

| Sample | No. | Stock wire dia. (mm) | Drawing steps Number of dies in each step * | Drawing steps Arrangement of dies in each step ** | Composition of lubricant for drawing | Drawing by hole dies ΣRd (%) | Drawing by roller dies Σrd (%) | Frame elongation (μm) | Drawability Max. drawing speed | Drawability Stable drawing amount | Drawability dents | Welding performance Wire dia. (mm) | Welding performance Wire feedability | Welding performance Arc stability |
|---|---|---|---|---|---|---|---|---|---|---|---|---|---|---|
| | 65 | 5.5 | I (5) + II (6) | 5R:5R,1D | ST-Na, MoS₂, A | 1.9 | 98.1 | 80 | ○ | ○ | ○ | 1.2 | ○ | ○ |
| | 66 | 5.5 | I (5) + II (6) | 1D,4R:4R,2D | ST-Na, MoS₂, A | 25.8 | 74.2 | 80 | ○ | ○ | ○ | 1.2 | ○ | ○ |
| | 67 | 5.5 | I (5) + II (6) | 3D,2R:5R,1D | ST-Na, MoS₂, A | 62.1 | 37.9 | 80 | ○ | ○ | ○ | 1.2 | ○ | ○ |
| | 68 | 5.5 | I (5) + II (6) | 3D,2R:1D,3R,2D | ST-Na,A MoS₂, A | 68.1 | 31.9 | 80 | ○ | ○ | ○ | 1.2 | ○ | ○ |
| | 69 | 5.5 | I (5) + II (6) | 5D:5R,1D | ST-Na, MoS₂, A | 77.9 | 22.1 | 80 | Δ | Δ | ○ | 1.2 | ○ | ○ |
| | 70 | 5.5 | I (5) + II (6) | 3D,2R:1D,3R,2D | ST-Na, MoS₂, A | 70.7 | 29.3 | 80 | ○ | ○ | ○ | 1.6 | ○ | ○ |

TABLE 4

| Sample | No. | Stock wire dia. (mm) | Drawing steps Number of dies in each step * | Drawing steps Arrangement of dies in each step ** | Composition of lubricant for drawing | Drawing by hole dies ΣRd (%) | Drawing by roller dies Σrd (%) | Frame elongation (μm) | Drawability Max. drawing speed | Drawability Stable drawing amount | Drawability dents | Welding performance Wire dia. (mm) | Welding performance Wire feedability | Welding performance Arc stability |
|---|---|---|---|---|---|---|---|---|---|---|---|---|---|---|
| Working sample | 71 | 3.2 | Single (6) | 5R,1D | ST-Na, MoS₂, A | 7.5 | 92.5 | 80 | ○ | ○ | ○ | 1.2 | ○ | ○ |
| | 72 | 3.2 | Single (6) | 1D,4R,1D | ST-Na, MoS₂, A | 35.0 | 65.0 | 80 | ○ | ○ | ○ | 1.2 | ○ | ○ |
| | 73 | 3.2 | Single (10) | 9R,1D | ST-Na, MoS₂, A | 2.5 | 97.5 | 80 | ○ | ○ | ○ | 1.2 | ○ | ○ |
| | 74 | 2.8 | Single (10) | 9R,1D | ST-Na, MoS₂, A | 4.4 | 95.6 | 80 | ○ | ○ | ○ | 1.2 | ○ | ○ |
| | 75 | 2.8 | Single (6) | 5R,1D | ST-Na, MoS₂, A | 5.6 | 94.4 | 80 | ○ | ○ | ○ | 1.2 | ○ | ○ |
| | 76 | 2.8 | Single (6) | 5R,1D | ST-Na, MoS₂, A | 33.8 | 66.2 | 80 | ○ | ○ | ○ | 1.2 | ○ | ○ |
| | 77 | 2.0 | Single (6) | 5R,1D | ST-Na, MoS₂, A | 3.8 | 96.2 | 80 | ○ | ○ | ○ | 1.2 | ○ | ○ |
| | 78 | 5.5 | I (7) + II (6) | 6D,1R:1D,3R,2D | ST-Na, MoS₂, A | 78.5 | 21.5 | 80 | Δ | Δ | ○ | 1.2 | Δ | ○ |
| | 79 | 5.5 | I (7) + II (9) | 5D,2R:1D,6R,2D | ST-Na, MoS₂, A | 78.9 | 21.1 | 80 | Δ | Δ | ○ | 0.9 | Δ | Δ |
| | 80 | 5.5 | I (5) + II (6) | 3D,2R:2D,2R,2D | ST-Na, MoS₂, A | 80.2 | 19.8 | 80 | Δ | Δ | ○ | 1.6 | Δ | Δ |
| | 81 | 3.2 | Single (10) | 6D,3R,1D | ST-Na, MoS₂, A | 79.0 | 21.0 | 80 | Δ | Δ | ○ | 1.2 | Δ | Δ |
| | 82 | 2.8 | Single (10) | 5D,2R,3D | ST-Na, MoS₂, A | 84.4 | 15.6 | 80 | Δ | Δ | ○ | 1.2 | Δ | Δ |
| | 83 | 2.8 | Single (6) | 4D,1R,1D | ST-Na, MoS₂, A | 90.0 | 10.0 | 80 | Δ | Δ | ○ | 1.2 | Δ | Δ |
| | 84 | 2.0 | Single (6) | 4D,1R,1D | ST-Na, MoS₂, A | 88.8 | 11.2 | 80 | Δ | Δ | ○ | 1.2 | Δ | Δ |
| Comparative Example | 85 | 5.5 | I (7) + II (8) All hole dies | 7D:8D | ST-Na, MoS₂, A | 100 | 0 | — | X | X | X | 1.2 | X | X |

Note to Tables 3 and 4.
* "I" denotes the primary drawing step, and "II" denotes the secondary drawing step. Paranthesized numeral denotes the number of dies used in each drawing step.
** "R" denotes the roller dies, and "D" denotes the hole dies. Numeral preceding R denotes the number of roller dies, and numeral preceding D denotes the number holes dies.

What is claimed is:

1. A method for producing a welding solid wire free of copper plating by drawing from a stock wire into a finished wire, said method comprising:
    a step of applying to the surface of a wire a dry solid lubricant for drawing which contains at least either of sodium stearate or potassium stearate;
    a step of drawing the lubricant-coated wire by means of roller dies;
    a step of removing the drawing lubricant from the surface of the drawn wire; and
    a step of applying a lubricant for wire feeding to the surface of the wire from which the dry solid lubricant for drawing has been removed,
    wherein at least part of the wire drawing step, the step of removing the dry solid lubricant for wire drawing, and the step of applying the lubricant for wire feeding are accomplished in-line.

2. The method for producing a welding solid wire as defined in claim 1, wherein the step of drawing consists of drawing the stock wire by means of roller dies to such an extent that the drawn wire has a diameter close to that of the nearly finished product and finish-drawing the previously drawn wire by means of hole dies to ensure that the finished product has a round cross section.

3. The method for producing a welding solid wire as defined in claim 1, wherein drawing by means of hole dies is carried out such that $\Sigma Rd$ (sum of reduction of diameter) is in the range of 0.5 to 78%, before the step of drawing by means roller dies or between the steps of drawing by means of roller dies.

4. The method for producing a welding solid wire as defined in claim 1, wherein drawing by means of roller dies employs those roller dies which are supported by a frame having a high stiffness such that the frame elongates within a range of 20 to 150 μm when stretched under a load of 10000 N in the direction of the expanding load of the roller dies.

5. The method for producing a welding solid wire as defined in claim 1, wherein the dry solid lubricant is composed of at least either of sodium nitride and potassium stearate and at least one species selected from sodium phosphate, sodium borate, sodium phosphite, sodium carbonate, potassium phosphate, potassium borate, potassium nitrite, and potassium carbonate.

6. The method for producing a welding solid wire as defined in claim 1, wherein the dry solid lubricant is one which contains at least one species of high pressure lubricant selected from $MoS_2$, $WS_2$, BN, ZnS, and graphite.

7. The method for producing a welding solid wire as defined in claim 1, wherein the lubricant for wire feeding is composed of at least one species of oil selected from vegetable oil, animal oil, mineral oil, and synthetic oil, and a lubricant containing at least one species of solid lubricant selected from $MoS_2$, $WS_2$, ZnS, and graphite.

* * * * *